United States Patent
Morita

(10) Patent No.: US 12,280,851 B2
(45) Date of Patent: Apr. 22, 2025

(54) OFF-ROAD VEHICLE AND VEHICLE CONTROL METHOD

(71) Applicant: Kawasaki Motors, Ltd., Akashi (JP)

(72) Inventor: Taisuke Morita, Akashi (JP)

(73) Assignee: Kawasaki Motors, Ltd., Akashi (JP)

( * ) Notice: Subject to any disclaimer, the term of this patent is extended or adjusted under 35 U.S.C. 154(b) by 222 days.

(21) Appl. No.: 17/806,546

(22) Filed: Jun. 13, 2022

(65) Prior Publication Data
US 2023/0399073 A1 Dec. 14, 2023

(51) Int. Cl.
| | |
|---|---|
| *B62K 5/01* | (2013.01) |
| *B60W 50/038* | (2012.01) |
| *B60W 50/14* | (2020.01) |
| *B62J 50/22* | (2020.01) |

(52) U.S. Cl.
CPC ............ *B62K 5/01* (2013.01); *B60W 50/038* (2013.01); *B60W 50/14* (2013.01); *B62J 50/22* (2020.02)

(58) Field of Classification Search
CPC ........ B26K 5/01; B26J 50/22; B60W 50/038; B60W 50/14
See application file for complete search history.

(56) References Cited

U.S. PATENT DOCUMENTS

| | | | |
|---|---|---|---|
| 2013/0261862 A1* | 10/2013 | Nishimori | B60W 10/119 701/1 |
| 2015/0014081 A1* | 1/2015 | Noguchi | B60W 30/02 180/65.265 |
| 2016/0375757 A1 | 12/2016 | Danielson et al. | |
| 2017/0246952 A1 | 8/2017 | Danielson et al. | |
| 2018/0038460 A1 | 2/2018 | Honjo | |
| 2018/0211454 A1* | 7/2018 | Carlson | B60W 50/0205 |
| 2020/0094840 A1* | 3/2020 | Nolin | B60W 30/18172 |
| 2020/0247383 A1 | 8/2020 | Aitcin et al. | |
| 2021/0356031 A1* | 11/2021 | Varaldi | G01M 13/023 |

* cited by examiner

*Primary Examiner* — Justin S Lee
(74) *Attorney, Agent, or Firm* — BURR PATENT LAW, PLLC

(57) ABSTRACT

Provided is an off-road vehicle including: a travel mechanism that includes a travel motor, wheels including a front wheel and a rear wheel, and a power transmission mechanism transmitting rotation from the travel motor to the wheels, the power transmission mechanism including a CVT belt and a transfer box switchable between a front and rear wheel drive mode and a rear wheel drive mode; a sensor that detects a travel condition caused by the travel mechanism; and processing circuitry that determines whether the travel condition caused by the travel mechanism has become a predetermined belt check request condition based on an output of the sensor, and performs, when determining that the travel condition has become the belt check request condition, travel function limitation processing of limiting a travel function performed by the travel mechanism more than that before determination.

16 Claims, 14 Drawing Sheets

OFF-ROAD VEHICLE AND VEHICLE CONTROL METHOD

BACKGROUND OF THE INVENTION

Field of the Invention

The present disclosure relates to off-road vehicles and vehicle control methods.

Description of the Background Art

US2020/0247383A1 discloses technology of detecting abuse of a drive belt of a continuously variable transmission (CVT), and limiting an output of a motor of a vehicle when the abuse is continued.

SUMMARY

An off-road vehicle according to one aspect includes: a travel mechanism that includes a travel motor, wheels including a front wheel and a rear wheel, and a power transmission mechanism transmitting rotation from the travel motor to the wheels and including a CVT belt and a transfer box switchable between a front and rear wheel drive mode in which rotation of the travel motor is transmitted to both the front wheel and the rear wheel and a rear wheel drive mode in which rotation of the travel motor is transmitted to the rear wheel; a sensor that detects a travel condition caused by the travel mechanism; and processing circuitry that determines whether the travel condition caused by the travel mechanism has become a predetermined belt check request condition based on an output of the sensor, and performs, when determining that the travel condition has become the belt check request condition, travel function limitation processing of limiting a travel function performed by the travel mechanism more than that before determination.

According to the off-road vehicle, a check on whether the CVT belt is required to be replaced at a more suitable timing can effectively be prompted by limitation of the travel function performed by the travel mechanism.

A vehicle control method according to another aspect includes: detecting a travel condition; determining, based on the detected travel condition, whether a cumulative travel condition in terms of a time or a distance has become a predetermined maintenance condition; and limiting a travel function more than that before determination when it is determined that the cumulative travel condition has become the predetermined maintenance condition.

According to the vehicle control method, maintenance at a more suitable timing can effectively be prompted by limitation of the travel function.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment

Figure 1:
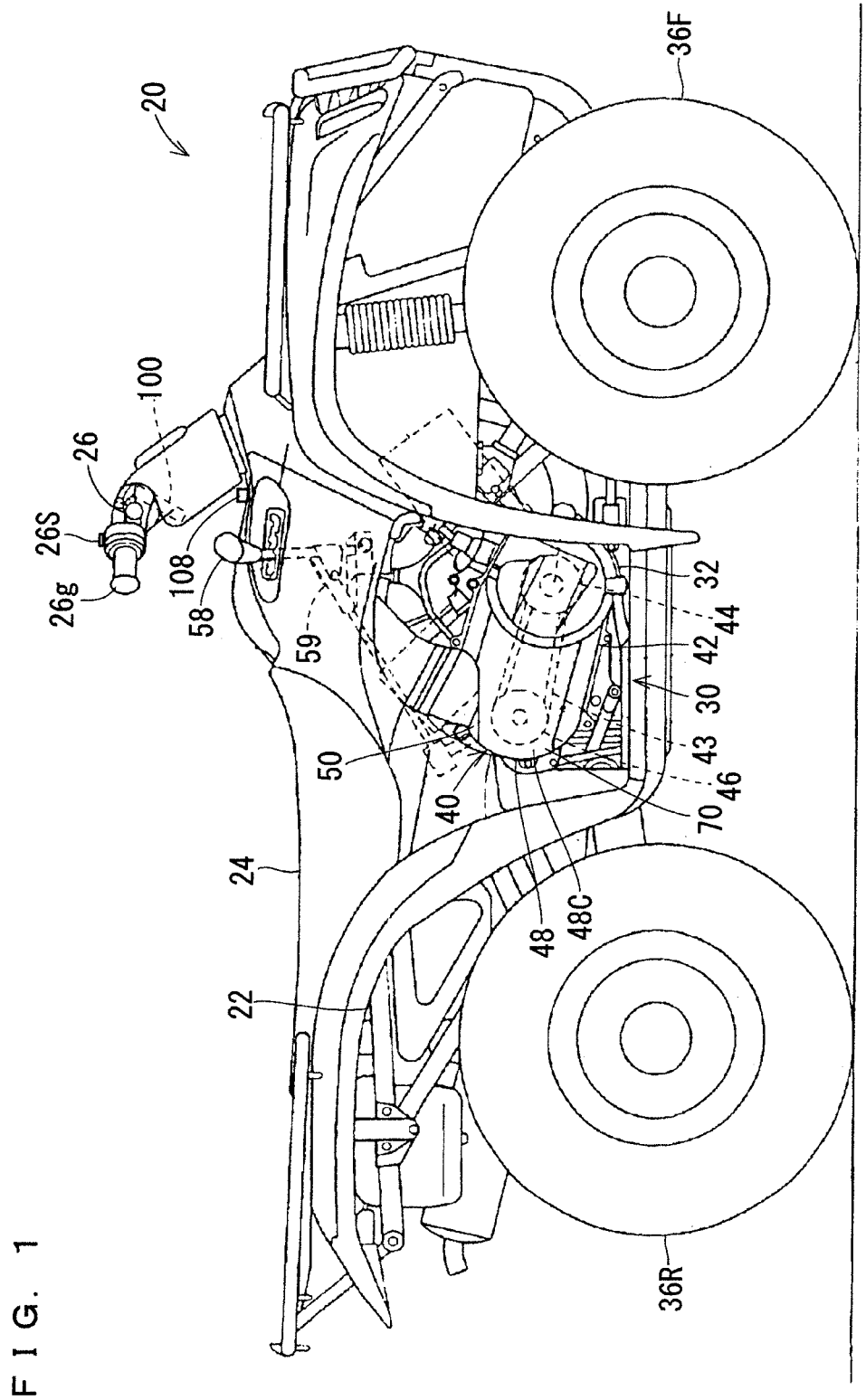
FIG. 1 is a side view illustrating an off-road vehicle according to an embodiment.

An off-road vehicle according to an embodiment will be described below. FIG. 1 is a side view illustrating an off-road vehicle 20.

The off-road vehicle 20 is a versatile small vehicle for one to six occupants suitable for off-road travel rather than for fast travel on a public road. The versatile small vehicle is assumed to include three or more wheels, for example. Assume that the off-road vehicle 20 includes four wheels in the present embodiment. The off-road vehicle 20 may be a three-wheel vehicle.

The off-road vehicle 20 may be one or both of an all terrain vehicle (ATV) and a side-by-side vehicle, for example.

The ATV is a small vehicle suitable for all terrain travel, and is a vehicle that an occupant can straddle to be seated, for example. The ATV may be a vehicle for an occupant or occupants. In a case where the ATV is for occupants, the occupants are assumed to straddle the vehicle in line in a direction of travel to ride the vehicle. The ATV may be a vehicle defined as the ATV by the American National Standards Institute (ANSI).

The side-by-side vehicle is a small vehicle suitable for all terrain travel, and is a vehicle that occupants can be seated side by side, for example. The side-by-side vehicle may be a multipurpose off-highway utility vehicle (MOHUV) defined by ANSI/OPEI B71.9-2016, and a recreational off-highway vehicle defined by ANSI/ROHVA 1-2016, for example.

The off-road vehicle 20 targeted for the present embodiment may be a vehicle including a continuously variable transmission (CVT) belt not made of metal but made of rubber and including three or more wheels, for example. The off-road vehicle 20 targeted for the present embodiment may be considered as a vehicle that the occupant straddles to ride the vehicle as with the ATV.

In the present embodiment, the direction of travel of the off-road vehicle 20 is a forward direction, a direction opposite the forward direction is a rearward direction, a direction of gravity is a downward direction, and a direction opposite the downward direction is an upward direction. With the occupant being seated on a seat while facing in the direction of travel, a left side and a right side are defined relative to the occupant.

<Overall Configuration of Off-Road Vehicle>

The off-road vehicle 20 includes a travel mechanism 30 including a travel motor 32, wheels 36F and wheels 36R, and a power transmission mechanism 40. Rotary drive force of the travel motor 32 is transmitted to the wheels 36F and wheels 36R via the power transmission mechanism 40. The off-road vehicle 20 thus travels. In the present embodiment, the off-road vehicle 20 includes a frame 22, and components of the vehicle including the travel motor 32, the wheels 36F and wheels 36R, and the power transmission mechanism 40 are supported by the frame 22. The frame 22 includes a combination of a metal pipe part, a metal plate part, and a cast part, for example. Part or all of the frame 22 may be covered with a cover.

The travel motor 32 is a device that generates power for travel using electricity, a combustible liquid, a combustible gas, and the like. The travel motor 32 is an internal combustion engine that combusts fuel in a combustion chamber, and provides power for travel generated due to gas expansion caused by combustion, for example. The travel motor 32 may be an electric motor that converts electrical energy into rotational movement for travel, or may be a combination of an internal combustion engine and a travel motor. Description will be made in the present embodiment based on the assumption that the travel motor 32 is the internal combustion engine. The travel motor 32 is supported by the frame 22 at an intermediate location in a fore-aft direction of the off-road vehicle 20, for example, at a location between front wheels 36F and rear wheels 36R.

The off-road vehicle 20 includes the front wheels 36F and the rear wheels 36R as the wheels. The two front wheels 36F are supported, at left and right locations in a front portion of the frame 22, to be rotatable about the central axes thereof and to be rotatable about a steering axis. The two rear wheels 36R are supported, at left and right locations in a rear portion of the frame 22, to be rotatable about the central axes thereof.

The power transmission mechanism 40 includes a CVT belt 43, and transmits rotation from the travel motor 32 to the wheels 36F and wheels 36R. The CVT belt 43 is an endless belt wrapped about a drive pulley 44 and a driven pulley 46 of a continuously variable transmission (CVT) 42. The CVT belt 43 is assumed to be a rubber belt, for example. That is to say, the power transmission mechanism 40 is a mechanism that transmits rotation of the travel motor 32 to the wheels 36F and wheels 36R, and is a mechanism that can continuously change a transmission gear ratio from the travel motor 32 to the wheels 36F and wheels 36R using the CVT 42 including the CVT belt 43.

The off-road vehicle 20 further includes a seat 24 and a handle 26. The seat 24 is supported by the frame 22 to be located above or rearward of the travel motor 32. The occupant can straddle the seat 24 to ride the vehicle. The handle 26 is located forward of the seat 24. The handle 26 is a handlebar-type handle including a pair of grips 26g extending outward from the center along the width of the vehicle. The occupant straddling the seat 24 can operate the handle 26 while holding the pair of grips 26g. Steering force of the handle 26 is transmitted to the front wheels 36F via a rack and pinion mechanism and the like, and thus the front wheels 36F can rotate about the steering axis.

The handle 26 includes brake levers, a throttle lever, and a 2WD/4WD switch 26S. The 2WD/4WD switch 26S is a switch to switch between a 2WD mode and a 4WD mode. A display device 100 is disposed between the grips 26g. The display device 100 is located forward of the seat 24, and is thus disposed to oppose the occupant straddling the seat 24. The display device 100 is thus an example of a notification device that provides information to the occupant of the off-road vehicle 20 so that the information is recognizable by the occupant. An ignition switch 108 is disposed below the handle 26 on one side of the display device 100. The occupant operates the ignition switch 108, so that the travel motor 32 starts to allow the off-road vehicle 20 to travel.

Figure 2:
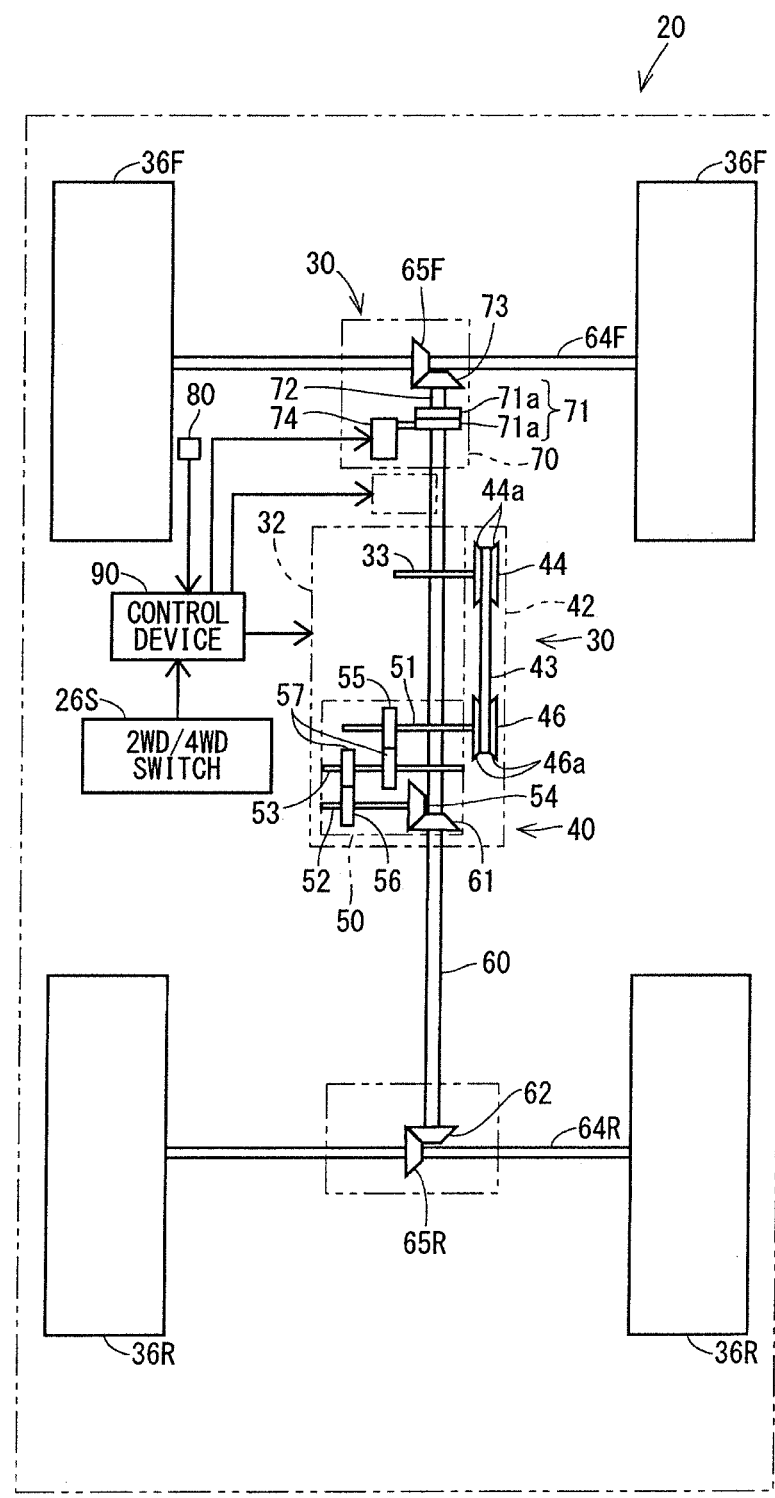
FIG. 2 shows a power transmission mechanism.

The power transmission mechanism 40 will be described. FIG. 2 shows the power transmission mechanism 40. The power transmission mechanism 40 includes the CVT 42, a gear type transmission 50, a propeller shaft 60, a transfer box 70, and front and rear wheel drive shafts 64F and 64R.

Rotation of the travel motor 32 is transmitted from the CVT 42 to the propeller shaft 60 via the gear type transmission 50. Rotation of the propeller shaft 60 is transmitted to the rear wheels 36R through the rear wheel drive shaft 64R. Rotation of the propeller shaft 60 is also transmitted to the front wheels 36F through the transfer box 70 and the front wheel drive shaft 64F. Whether the front wheels 36F are driven is switched by switching operation of the transfer box 70.

<Power Transmission Mechanism>

Components of the power transmission mechanism 40 will be described.

The gear type transmission 50 is located in a rear portion of the travel motor 32. For example, a case of the travel motor 32 and a case of the gear type transmission 50 are integrated. The CVT 42 is disposed outward of the travel motor 32 and the gear type transmission 50 along the width of the vehicle.

The CVT 42 includes the drive pulley 44, the driven pulley 46, and the CVT belt 43.

A drive shaft 33 rotationally driven by the travel motor 32 extends, on one side along the width of the vehicle of the travel motor 32, along the width of the vehicle. The drive pulley 44 is supported by the drive shaft 33. The drive pulley 44 includes two drive sheaves 44a, and at least one of the two drive sheaves 44a is supported to be movable along the axis of the drive shaft 33. Opposite surfaces of the two drive sheaves 44a are conical peripheral surfaces.

A driven shaft 51 that transmits rotation to the gear type transmission 50 extends, on one side along the width of the vehicle of the gear type transmission 50, along the width of the vehicle. The driven shaft 51 extends in parallel with the drive shaft 33 at a location rearward of the drive shaft 33, for example. The driven pulley 46 is supported by the driven shaft 51. The driven pulley 46 includes two driven sheaves 46a, and at least one of the two driven sheaves 46a is supported to be movable along the axis of the driven shaft 51. Opposite surfaces of the two driven sheaves 46a are conical peripheral surfaces.

The CVT belt 43 is wrapped between the conical peripheral surfaces of the two drive sheaves 44a and between the conical peripheral surfaces of the two driven sheaves 46a. At least one of spacing between the two drive sheaves 44a or spacing between the two driven sheaves 46a is changed to change a pulley wrapping diameter of at least either the two drive sheaves 44a or the two driven sheaves 46a to change the transmission gear ratio of the CVT 42. Spacing between the two drive sheaves 44a and spacing between the two driven sheaves 46a are adjusted using centrifugal force acting on the drive sheaves 44a or the driven sheaves 46b depending on the number of rotations, for example.

The CVT belt 43, the drive pulley 44, and the driven pulley 46 described above are assumed to be housed in a case 48 located on one side of the travel motor 32 and the gear type transmission 50. The case 48 is covered with a removable cover 48C, and the cover 48C is removed to expose the CVT belt 43. With the CVT belt 43 being exposed, the CVT belt 43 can be removed from the drive pulley 44 and the driven pulley 46, and replaced with another CVT belt 43. The CVT belt 43 is assumed to be worn away by rubbing against the drive pulley 44 and the driven pulley 46. In a case where the CVT belt 43 is the rubber belt, the CVT belt 43 is more likely to be worn away than a metal belt. The CVT belt 43 is thus a part to be replaced when worn away.

The gear type transmission 50 is a transmission including gears 55, 56, and 57. The gears include a gear 55 supported by the driven shaft 51, a gear 56 supported by a transmission output shaft 52, and gears 57 supported by an intermediate shaft 53, for example. The gear 55 meshes with one of the gears 57, and the other one of the gears 57 meshes with the gear 56. Rotation of the driven shaft 51 is transmitted to the transmission output shaft 52 via the gears 55, 57, and 56. In the gear type transmission 50, rotation is transmitted at a certain transmission gear ratio depending on a diameter or the number of teeth of each of the gears 55, 56, and 57.

The gear type transmission 50 may include a low gear and a high gear. In this case, operation of a transmission lever 58 (see FIG. 1) performed by the occupant may be transmitted to the gear type transmission 50 via a link 59, and thus a combination of gears that transmits rotation from the driven shaft 51 to the transmission output shaft 52 may be switched between a gear group including the low gear and a gear group including the high gear, for example.

The gear type transmission 50 may include a forward gear and a rearward gear. In this case, operation of the transmission lever 58 (see FIG. 1) performed by the occupant may be transmitted to the gear type transmission 50 via the link 59, and thus the combination of gears that transmits rotation from the driven shaft 51 to the transmission output shaft 52 may be switched between a gear group including the forward gear and a gear group including the rearward gear, for example.

The propeller shaft 60 is disposed along the fore-aft direction of the off-road vehicle 20. The propeller shaft 60 extends forward of and rearward of the gear type transmission 50 while passing through the gear type transmission 50.

Rotation is transmitted from the transmission output shaft 52 to the propeller shaft 60. For example, a bevel gear 54 is fixed to the above-mentioned transmission output shaft 52. A bevel gear 61 is fixed to the propeller shaft 60 at a location where the propeller shaft 60 intersects with the transmission output shaft 52. The bevel gear 54 and the bevel gear 61 mesh with each other to transmit rotation of the transmission output shaft 52 to the propeller shaft 60 to rotationally drive the propeller shaft 60.

Rotation is transmitted from the propeller shaft 60 to the rear wheel drive shaft 64R. For example, a bevel gear 62 is fixed to a rear end of the propeller shaft 60. A bevel gear 65R is fixed to the rear wheel drive shaft 64R. The bevel gear 62 and the bevel gear 65R mesh with each other to transmit rotation of the propeller shaft 60 to the rear wheel drive shaft 64R. The rear wheels 36R are thus rotationally driven for travel.

Rotation is transmitted from the propeller shaft 60 to the front wheel drive shaft 64F. In the present embodiment, rotation of the propeller shaft 60 is transmitted to the wheel drive shaft 64F via the transfer box 70.

The transfer box 70 switches a mode of power transmission from the travel motor 32 to the wheels 36F and wheels 36R between a front and rear wheel drive mode and a rear wheel drive mode. The front and rear wheel drive mode is a mode in which rotation of the travel motor 32 is transmitted to both the front wheels 36F and the rear wheels 36R. The rear wheel drive mode is a mode in which rotation of the travel motor 32 is transmitted to the rear wheels 36R. The rear wheel drive mode is a mode in which rotation of the travel motor 32 is transmitted to the rear wheels 36R and is not transmitted to the front wheels 36F.

The transfer box 70 includes a dog clutch 71, a relay shaft 72, and a bevel gear 73, for example. The dog clutch 71 includes a pair of gears 71a arranged to oppose each other. One of the gears 71a is supported by a front end of the propeller shaft 60. The other one of the gears 71a is supported by the relay shaft 72. The pair of gears 71a is disposed so that one of the gears 71a can move closer to and away from the other one of the gears 71a. The gears 71a are brought closer to each other and mesh with each other to transmit rotation from the propeller shaft 60 to the relay shaft 72. The gears 71a are arranged away from each other to interrupt transmission of rotation from the propeller shaft 60 to the relay shaft 72. One of the gears 71a is moved by driving an actuator 74, such as a hydraulic cylinder. For example, the gear 71a is splined to the front end of the propeller shaft 60. The gear 71a can rotate in synchronization with rotation of the propeller shaft 60, and also can move along the axis of the propeller shaft 60. The gear 71a is driven along the axis of the propeller shaft 60 by a shift fork driven by the actuator 74 to switch a mesh of the dog clutch 71.

The bevel gear 73 is fixed to a front end of the relay shaft 72. A bevel gear 65F is fixed to the front wheel drive shaft 64F. The bevel gear 73 and the bevel gear 65F mesh with each other to transmit rotation of the relay shaft 72 to the front wheel drive shaft 64F.

With the gears 71a of the dog clutch 71 meshing with each other, rotation of the propeller shaft 60 is transmitted from the dog clutch 71 to the wheel drive shaft 64F through the relay shaft 72 to rotationally drive the front wheels 36F for travel. This mode is the front and rear wheel drive mode in which the front wheels 36F and the rear wheels 36R are driven for travel. The off-road vehicle 20 is a four-wheel vehicle in the present embodiment, so that this mode is a four-wheel drive mode. The four-wheel drive mode is also referred to as a 4WD mode.

With the gears 71a of the dog clutch 71 not meshing with each other, rotation of the propeller shaft 60 is not transmitted to the front wheels 36F. This mode is the rear wheel drive mode in which the rear wheels 36R are driven for travel. The off-road vehicle 20 is the four-wheel vehicle, and the rear wheels 36R are driven in the present embodiment, so that this mode is the rear wheel drive mode. A front or rear wheel drive mode is also referred to as a 2WD mode. In this mode, the front wheels 36F are driven to rotate while being in contact with the ground with travel of the off-road vehicle 20.

The off-road vehicle 20 further includes a sensor 80 and a control device 90.

The sensor 80 is a sensor that detects a travel condition caused by the travel mechanism 30. In the present embodiment, the sensor 80 is a rotation sensor that detects the number of rotations of at least either the wheels 36F or the wheels 36R. When the travel mechanism 30 causes the off-road vehicle 20 to travel, the wheels 36F and wheels 36R rotate. Rotation of at least either the wheels 36F or the wheels 36R is detected by the rotation sensor. The rotation sensor is thus an example of a sensor that detects the travel condition caused by the travel mechanism 30.

The travel condition caused by the travel mechanism 30 is a cumulative travel condition in terms of a time or a distance unaccompanied by determination of an anomaly of the travel mechanism itself. The sensor is thus not a sensor that detects the anomaly of the travel mechanism 30 itself.

The control device 90 electrically controls the off-road vehicle 20. For example, the control device 90 controls the travel motor 32 in response to an output of the sensor 80 and a driving command via the throttle lever. The control device 90 may adjust a degree of opening of a fuel injection valve of the travel motor 32, for example.

The control device 90 also controls the actuator 74 based on a switching command via the 2WD/4WD switch 26S to switch the transfer box 70 between the front and rear wheel drive mode and the rear wheel drive mode, for example. The control device 90 can also control display of the display device 100.

The control device 90 may perform various types of control other than the above-mentioned control, such as control of the transmission gear ratio of the CVT 42.

<Block Diagram>

Figure 3:
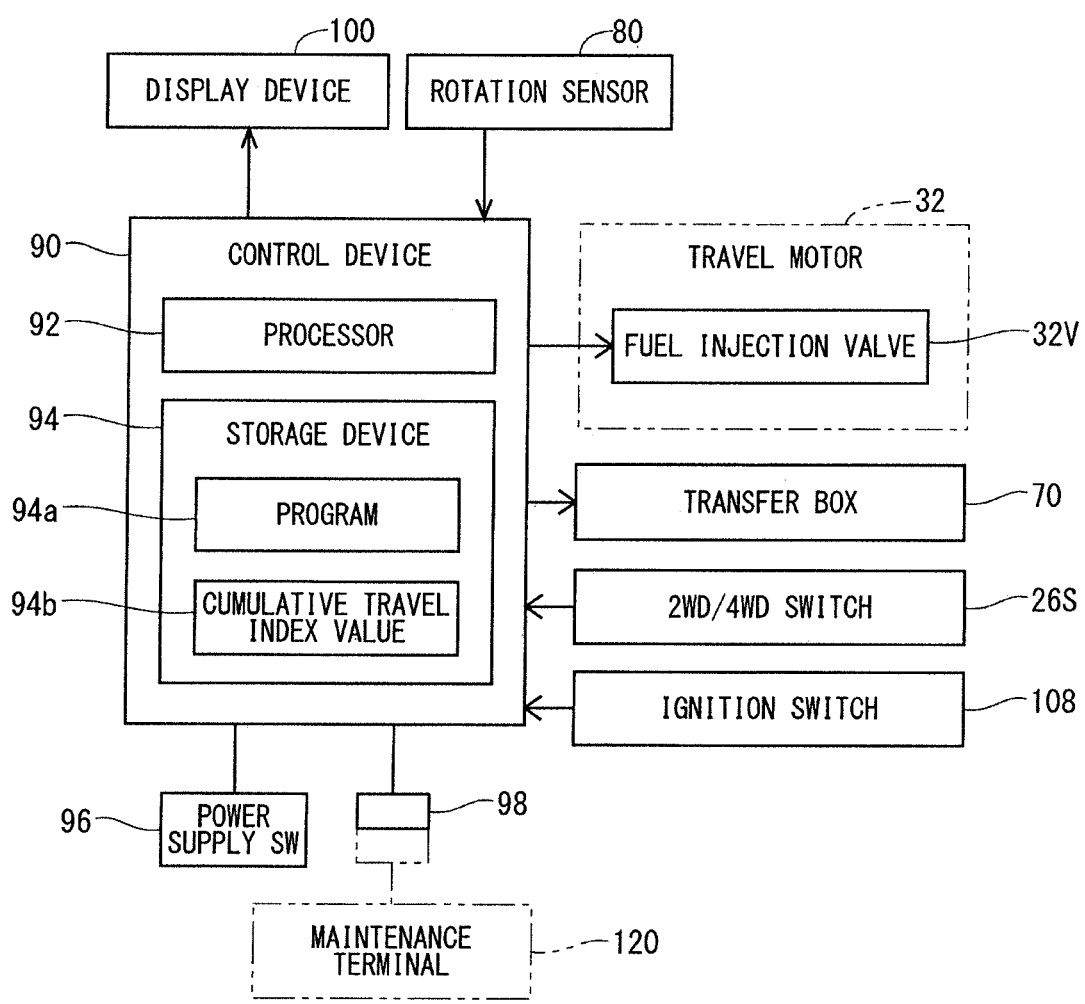
FIG. 3 is a block diagram showing an electrical configuration of the off-road vehicle.

FIG. 3 is a block diagram showing an electrical configuration of the off-road vehicle 20. The control device 90 is a computer that includes a processor 92, a storage device 94, and the like. The control device 90 is an example of processing circuitry. The processor 92 is electrical circuitry including arithmetic circuitry, and is a central processing unit (CPU), for example. The processor 92 may include one or more processor cores. Processing performed by the control device 90 may be achieved by one or more processors 92 of the control device 90, or may be achieved by cooperative processing of control devices. The storage device 94 is nonvolatile memory, such as flash memory. A software program 94a is stored in the storage device 94. The processor 92 performs arithmetic operation according to procedures described in the program 94a to perform control described below. A cumulative travel index value 94b is stored in the storage device 94. The cumulative travel index value 94b is an index value according to the amount of travel of the off-road vehicle 20. The amount of travel of the off-road vehicle 20 includes a travel distance or a travel time, for example. The cumulative travel index value 94b thus may be the travel distance itself or the travel time itself. The cumulative travel index value 94b may be another index value that increases or decreases with increasing travel distance or travel time.

The control device 90 is connected to the ignition switch 108, the rotation sensor 80, the 2WD/4WD switch 26S, the transfer box 70, a fuel injection valve 32V of the travel motor 32, and the display device 100.

The ignition switch 108 is a switch to start the travel motor 32. The occupant performs operation to turn on the ignition switch 108 to cause the control device 90 to start the travel motor 32.

The rotation sensor 80 is a sensor that detects the number of rotations of at least either the wheels 36F or the wheels 36R. Description will be made in the present embodiment based on the assumption that the rotation sensor 80 detects the number of rotations of the front wheels 36F. A result of detection of the rotation sensor 80 is output to the control device 90. A diameter and a perimeter of each of the front wheels 36F attached to the off-road vehicle 20 may be considered to have defined values. The control device 90 can thus calculate the travel distance of the off-road vehicle 20 by multiplying the number of rotations of each of the wheels 36F based on the output of the rotation sensor 80 by the perimeter of each of the wheels 36F. The control device 90 can also calculate a speed by determining the travel distance per unit time.

The 2WD/4WD switch 26S is a switch that receives the switching command to switch to the 2WD mode or the 4WD mode from the occupant. The command received by the 2WD/4WD switch 26S is provided to the control device 90.

The transfer box 70 controls driving of the actuator 74 of the transfer box 70 according to control performed by the control device 90. The transfer box 70 is thus controlled to be switched between the front and rear wheel drive mode and the rear wheel drive mode.

The travel motor 32 includes the fuel injection valve 32V to adjust the amount of fuel injected into the combustion chamber. The control device 90 adjusts the degree of opening of the fuel injection valve 32V according to a degree of opening of a throttle in response to an operation command from the throttle lever and the like, for example. The control device 90 adjusts the degree of opening of the fuel injection valve 32V to control an output of the travel motor 32. As will be described below, the degree of opening of the fuel injection valve 32V is sometimes limited to limit the output of the travel motor 32 regardless of operation of the throttle.

The travel motor 32 sometimes includes another combustion control part to control combustion, such as an electronic throttle. The travel motor 32 sometimes includes another sensor that detects operation of the travel motor 32, such as a rotation sensor and an oil temperature sensor. An output of each sensor is provided to the control device 90. The control device 90 may control the combustion control part of the travel motor 32 based on the output of the sensor.

The display device 100 provides display according to display control performed by the control device 90.

The control device 90 may include an electrical connector 98 to which a maintenance terminal 120 can be connected. The maintenance terminal 120 is a computer that includes a processor, a storage device, and the like. The maintenance terminal 120 is a maintenance computer owned by a maintainer of the off-road vehicle 20, for example. The maintenance terminal 120 is communicatively connected to the control device 90 via the electrical connector 98 to update data of the control device 90 and grasp history of operation of the travel motor 32 grasped by the control device 90. The maintenance terminal 120 and the control device 90 may be connected by radio communication. By connecting the maintenance terminal 120 to the control device 90, a command to reset the cumulative travel index value 94b can be provided to the control device 90 through the maintenance terminal 120. The off-road vehicle 20 may include a switch to reset the cumulative travel index value 94b.

A power supply switch 96 is connected to the control device 90, and, by turning on the power supply switch 96, the control device 90 may be started to perform various types of processing. The control device 90 may be started from a sleep mode or may be started from a completely power off mode.

Example of Display of Display Device

Figure 4:
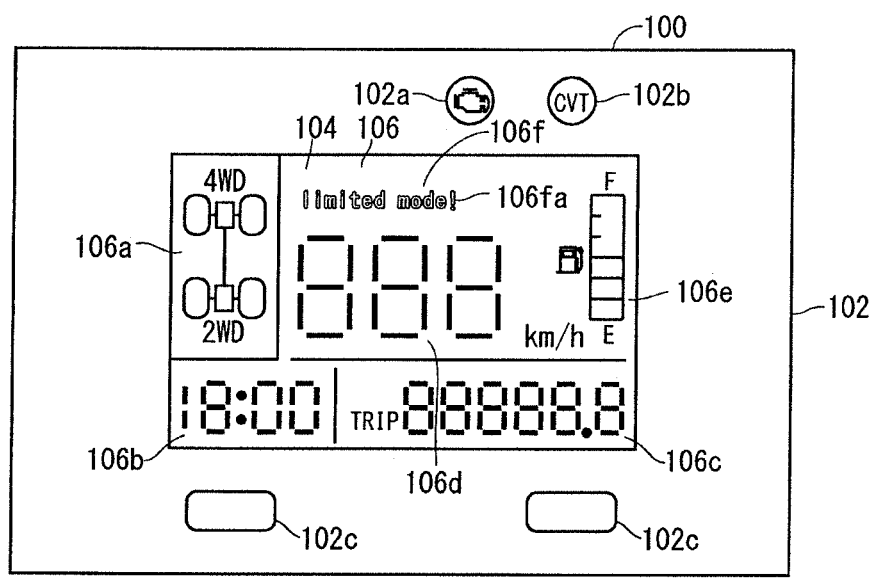
FIG. 4 shows an example of display of a display device.

FIG. 4 shows an example of display of the display device 100. The display device 100 displays information to provide notification of a belt check request condition in response to a command from the control device 90. The display device 100 is thus an example of a notification device that provides notification of the belt check request condition.

In the present embodiment, the display device 100 includes a frame 102 and a display body 104. The display body 104 is a liquid crystal display or an organic electroluminescence (EL) display, and has a rectangular display screen 106. The frame 102 is a rectangular frame surrounding a perimeter of the display body 104.

The frame 102 includes an engine warning light 102a and a CVT warning light 102b. The engine warning light 102a and the CVT warning light 102b each include a light emitter, such as a light emitting diode, and emission of light is controlled by the control device 90. The engine warning light 102a lights up or blinks to provide notification of an anomaly of the travel motor 32. The CVT warning light 102b lights up or blinks to provide notification of warning about the CVT 42. The frame 102 may include switches 102c to reset the travel distance and set the time.

The display screen 106 includes a 2WD/4WD mode display region 106a, a time-of-day display region 106b, a travel distance display region 106c, a speed display region 106d, a fuel level display region 106e, and a CVT check request display region 106f. For example, in a region above the middle in the vertical direction of the display screen 106, the 2WD/4WD mode display region 106a, the speed display region 106d, and the fuel level display region 106e are displayed from left to right in this order. The speed display region 106d is displayed to be widest. The CVT check request display region 106f is displayed above the speed display region 106d. The CVT check request display region 106f is a region in which warning information 106fa indicating a request to check whether the CVT belt 43 is required to be replaced is displayed. In the present embodiment, a travel function is limited at a timing of the request to check whether the CVT belt 43 is required to be replaced. Warning information "limited mode!" that suggests limitation of the travel function is thus displayed as the warning information 106fa indicating the request to check whether the CVT belt 43 is required to be replaced. The time-of-day display region 106b is disposed in a lower left portion of the display screen 106, and the travel distance display region 106c is displayed in a lower right portion of the display screen 106. In the travel distance display region 106c, a cumulative travel distance since new or a sectional travel distance since resetting may be displayed in response to switching operation of a switch 102c.

Display in the CVT check request display region 106f is not limited to that in the above-mentioned example. For example, the CVT check request display region 106f may be a region in which a more direct message "please check whether the CVT belt is required to be replaced!" is displayed. The CVT check request display region 106f may be a region in which a graphic or a symbol designed to request the check on whether the CVT belt is required to be replaced is displayed, for example. The CVT check request display region 106f may not necessarily be set as a display region of the display body 104, and may light up using a lighting device, such as a light emitting diode and an electric bulb.

The above-mentioned display device 100 includes the speed display region 106d, and is thus a display device to provide travel information including speed information to the occupant. The layout and sizes of the regions on the display screen 106 are not limited to those in the above-mentioned example, and may be any layout and sizes.

Example of Processing

Figure 5:
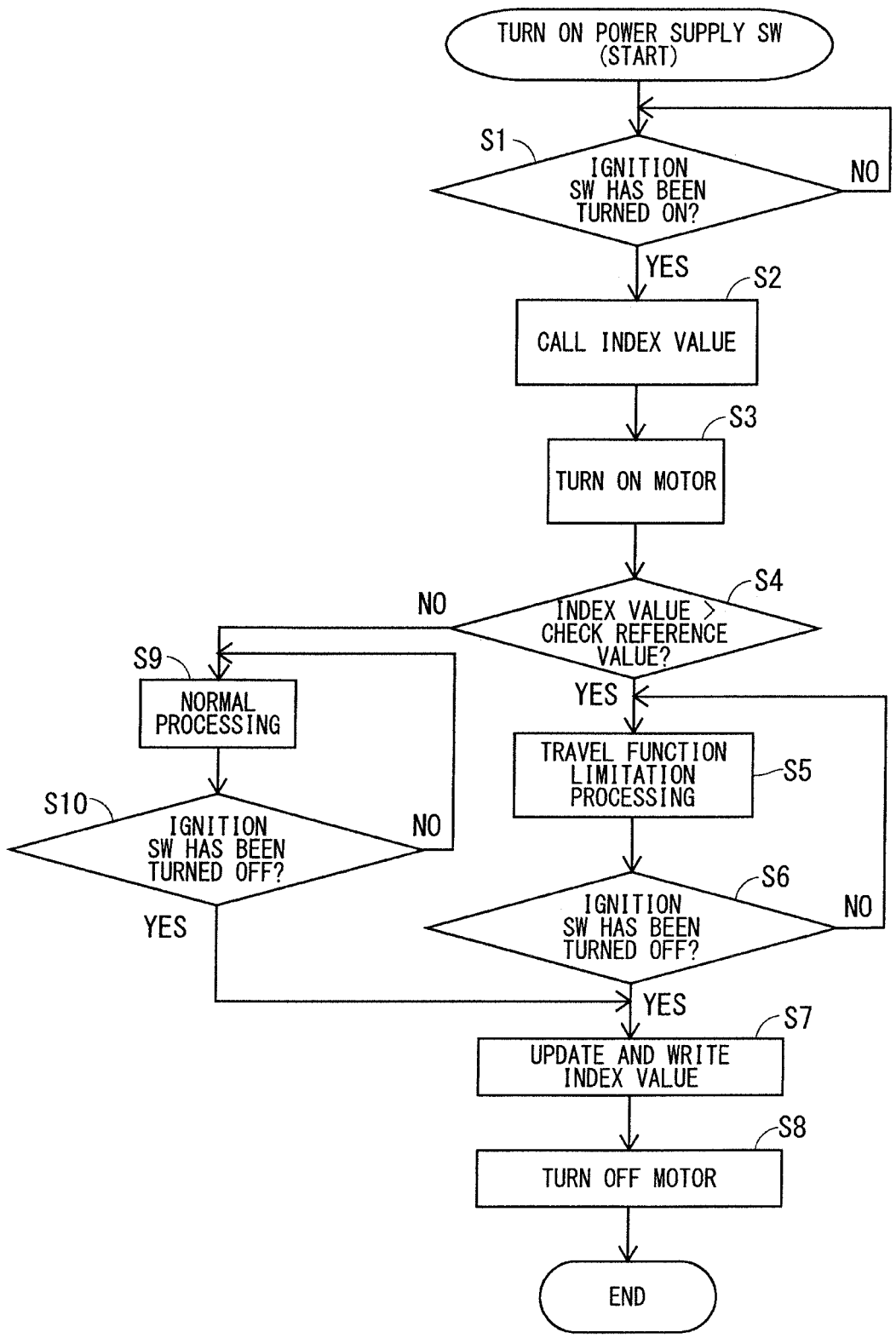
FIG. 5 is a flowchart showing an example of processing performed by a control device.

FIG. 5 is a flowchart showing an example of processing performed by the control device 90. Processing shown in FIG. 5 is performed in parallel with or in quasi-parallel with processing performed by the control device 90 for travel of the off-road vehicle 20.

The control device 90 determines whether the travel condition caused by the travel mechanism 30 has become the predetermined belt check request condition based on the output of the rotation sensor 80 and performs, when determining that the travel condition has become the belt check request condition, travel function limitation processing of limiting a travel function performed the travel mechanism 30 more than that before determination. The flowchart in FIG. 5 shows an example of the processing. The flowchart in FIG. 5 includes processing of updating settings to determine the cumulative travel index value indicating a cumulative travel condition based on the output of the rotation sensor 80.

The occupant turns on the power supply switch 96, so that power is supplied to the control device 90 to start the processing. First, as shown in step S1, whether the ignition switch 108 has been turned on is determined. Processing in step S1 is repeated until it is determined that the ignition switch 108 has been turned on. For example, when the occupant performs operation to turn on the ignition switch 108, it is determined that the ignition switch 108 has been turned on, and processing proceeds to the next step S2.

In step S2, the processor 92 calls the cumulative travel index value 94b from the storage device 94. As will be described below, the cumulative travel index value 94b is a value based on the output of the rotation sensor 80.

In the next step S3, the travel motor 32 starts. This allows for travel of the off-road vehicle 20. Step S2 may be performed after step S3.

In the next step S4, whether the cumulative travel index value 94b has exceeded a check reference value is determined. The check reference value is a value stored in the storage device 94 in advance. The check reference value is a value set in advance as a value to determine whether the travel condition has become the check request condition for replacement of the CVT belt 43. That is to say, wear of the CVT belt 43 progresses as the off-road vehicle 20 travels. The check reference value is set as a value to check whether the CVT belt 43 deteriorated due to wear and the like is replaced. Whether the travel condition has become the check request condition is thus determined based on the output of the rotation sensor 80 in step S4.

In a case where the cumulative travel index value 94b is set as a cumulative travel time, the check reference value is set as a travel time to check whether the CVT belt 43 is required to be replaced. In a case where the cumulative travel index value 94b is set as the cumulative travel distance, the check reference value is set as a travel distance to check whether the CVT belt 43 is required to be replaced. Processing proceeds to step S5 when the cumulative travel index value 94b has exceeded the check reference value. Processing proceeds to step S9 when the cumulative travel index value 94b has not exceeded the check reference value. Processing may proceed to either step S5 or step S9 when the cumulative travel index value 94b is the same as the check reference value. In a case where two values are compared in each of determination steps described below, determination may be either affirmative or negative when the values are the same.

In step S5, the travel function limitation processing is set. That is to say, when it is determined that the travel condition has become the belt check request condition in step S4, the travel function limitation processing is performed in step S5. The travel function limitation processing will be described below. The control device 90 thus performs the travel function limitation processing of limiting the travel function performed by the travel mechanism 30 more than that before determination in step S4 as will be described below. In the present embodiment, determination in step S4 is made after the travel motor 32 is turned on, that is, when travel starts, so that the travel function limitation processing in step S5 is processing of limiting the travel function more than that during previous travel.

In the next step S6, whether the ignition switch 108 has been turned off is determined. Processing returns to step S5 to continue the travel function limitation processing when it is determined that the ignition switch 108 has not been turned off. When the occupant turns off the ignition switch 108, for example, it is determined that the ignition switch 108 has been turned off, and processing proceeds to the next step S7.

When determination in step S4 is negative, processing proceeds to step S9 to perform normal processing for travel. That is to say, in this case, the travel function limitation processing is not performed, and the off-road vehicle 20 can travel with the travel function that is the same as the travel function before determination in step S4.

In the next step S10, whether the ignition switch 108 has been turned off is determined. Processing returns to step S9 to continue the normal processing without performing the travel function limitation processing when it is determined that the ignition switch 108 has not been turned off. When the occupant turns off the ignition switch 108, for example, it is determined that the ignition switch 108 has been turned off, and processing proceeds to the next step S7.

In step S7, processing of updating and writing the cumulative travel index value 94*b* in the storage device 94 is performed based on an input from the rotation sensor 80. The cumulative travel index value 94*b* is a cumulative travel index value relative to a value when the off-road vehicle 20 is new or at resetting. A new CVT belt 43 is attached when the off-road vehicle 20 is new. The cumulative travel index value 94*b* is assumed to be reset when the CVT belt 43 is replaced. The cumulative travel index value 94*b* is thus an index value relative to a value when the CVT belt 43 is new.

The cumulative travel index value 94*b* stored in the storage device 94 is a value updated and written during previous travel. In this processing, a travel index value due to current travel of the off-road vehicle 20 in and after step S3 is added to the cumulative travel index value 94*b* stored in the storage device 94, and the index value after addition is written as the cumulative travel index value 94*b*.

The cumulative travel index value 94*b* is the cumulative travel distance, for example. In this case, the control device 90 counts the number of rotations after the travel motor 32 is turned on (see step S3) until the ignition switch 108 is turned off (see step S6) based on the output of the rotation sensor 80, and multiplies the number of rotations by the travel distance per rotation, for example. The travel distance per rotation can be a known value according to the perimeter of each of the front wheels 36F. The travel distance of the off-road vehicle 20 during current travel is thus determined. The travel distance during current travel calculated based on the output of the rotation sensor 80 is added to the cumulative travel index value 94*b* stored in the storage device 94, and the value after addition is written in the storage device 94 as the cumulative travel index value 94*b*.

The cumulative travel index value 94*b* may be the cumulative travel time, for example. In this case, the control device 90 adds up an output time of the rotation sensor 80 after the travel motor 32 is turned on (see step S3) until the ignition switch 108 is turned off (see step S6) based on the output of the rotation sensor 80, for example. The travel time during current travel based on the output of the rotation sensor 80 is added to the cumulative travel index value 94*b* stored in the storage device 94, and the value after addition is written in the storage device 94 as the cumulative travel index value 94*b*. Processing in step S7 may be performed after the travel motor 32 is turned off in step S8.

In the next step S8, the travel motor 32 is turned off to end processing.

Figure 6:
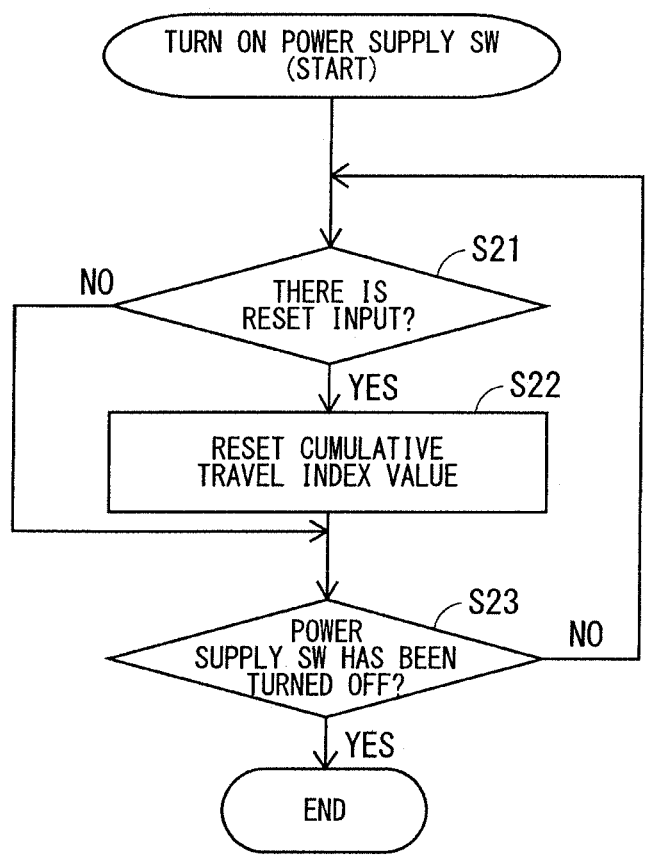
FIG. 6 is a flowchart showing an example of processing of updating settings of a cumulative travel index value performed by the control device.

FIG. 6 is a flowchart showing processing of resetting the cumulative travel index value indicating the cumulative travel condition performed by the control device 90. Processing shown in FIG. 6 is performed in parallel with or in quasi-parallel with processing shown in FIG. 5 and processing performed by the control device 90 for travel of the off-road vehicle 20. Assume that the cumulative travel index value 94*b* during previous travel is stored in the storage device 94 as the cumulative travel index value 94*b*.

The occupant turns on the power supply switch 96, so that power is supplied to the control device 90 to start the processing.

In step S21, whether there is a reset input is determined. For example, the maintenance terminal 120 is connected to the control device 90, and the maintainer inputs a command to reset the cumulative travel index value 94*b* through the maintenance terminal 120. Processing proceeds to step S22 when it is determined that there is the reset input, and proceeds to step S23 when it is determined that there is not the reset input.

In step S22, the cumulative travel index value 94*b* stored in the storage device 94 is reset to be a value "0". For example, the maintainer can input the reset command through the maintenance terminal 120 to reset the cumulative travel index value 94*b* to the value "0" when the CVT belt 43 is replaced. Processing then proceeds to step S23.

In the next step S23, whether the power supply switch 96 has been turned off is determined. Processing returns to step S21 to repeat processing in and after step S21 when it is determined that the power supply switch 96 has not been turned off. Processing ends when it is determined that the power supply switch 96 has been turned off.

Processing of determining the cumulative travel index value 94*b* and processing of resetting the cumulative travel index value 94*b* are not limited to those in the above-mentioned example. For example, when a total output continuation time of the rotation sensor 80 of the off-road vehicle 20 is logged as a total use time of the off-road vehicle 20, a replacement time when the CVT belt 43 is new may be recorded separately. The replacement time when the CVT belt 43 is new has a value "0" when the off-road vehicle 20 is new, and is reset to a replacement time based on the total use time at resetting by the reset input. Resetting the replacement time means resetting the cumulative travel index value 94*b*. In this case, the cumulative travel index value 94*b* can be determined as the cumulative travel time by subtracting the replacement time when the CVT belt 43 is new from the total use time.

When a total travel distance of the off-road vehicle 20 based on the rotation sensor 80 of the off-road vehicle 20 is logged, the travel distance when the CVT belt 43 is new may be recorded separately, for example. The travel distance when the CVT belt 43 is new has a value "0" when the off-road vehicle 20 is new, and is reset to a travel distance based on the total travel distance at resetting by the reset input. Resetting the travel distance means resetting the cumulative travel index value 94*b*. In this case, the cumulative travel index value 94b can be determined as the cumulative travel distance by subtracting the travel distance when the CVT belt 43 is new from the total travel distance.

Figure 7:
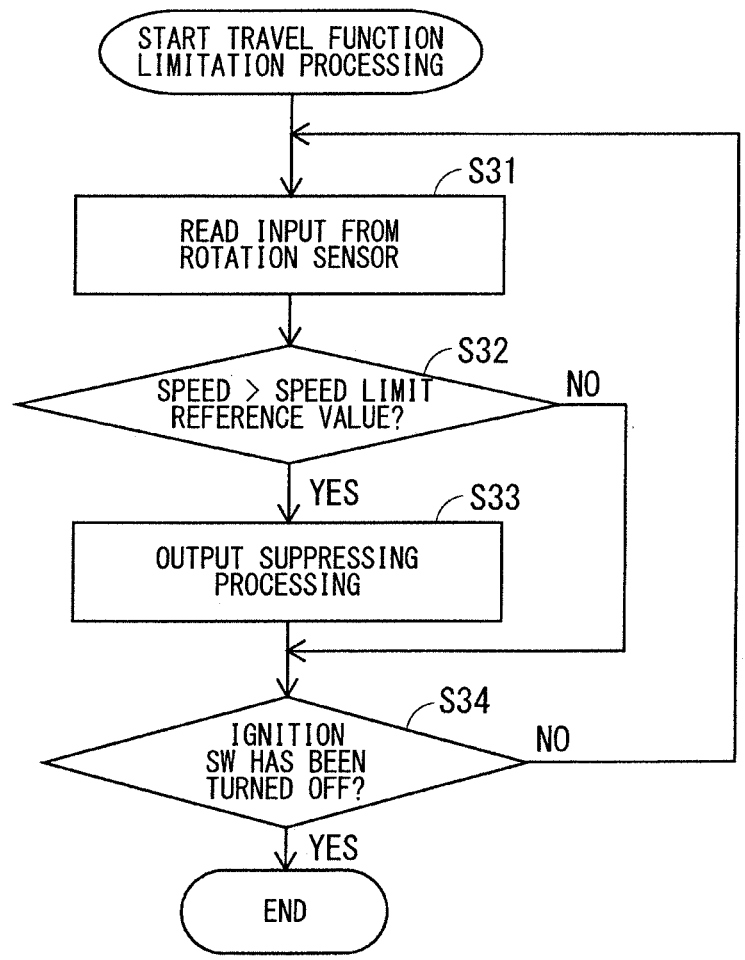
FIG. 7 is a flowchart showing an example of travel function limitation processing performed by the control device.

FIG. 7 is a flowchart showing an example of the travel function limitation processing performed by the control device 90. The travel function limitation processing can be performed in step S5 in FIG. 5.

First, in step S31, the input from the rotation sensor 80 is read.

In the next step S32, a speed of the off-road vehicle 20 calculated based on the input from the rotation sensor 80 and a speed limit reference value are compared to determine whether the speed exceeds the speed limit reference value. The speed limit reference value is a value set in advance as a value desired as a maximum speed at a timing of the check on whether the CVT belt 43 is required to be replaced, and stored in the storage device 94 and the like. The speed limit reference value is 30 km/h, for example. At the timing of the check on whether the CVT belt 43 is required to be replaced, the off-road vehicle 20 preferably travels at a speed lower than the speed limit reference value. Processing proceeds to step S33 when it is determined that the speed exceeds the speed limit reference value, and proceeds to step S34 when it is determined that the speed does not exceed the speed limit reference value. Processing may proceed to either step S33 or step S34 when the speed is the same as the speed limit reference value.

In step S33, processing of suppressing the output of the travel motor 32 is performed. For example, the control device 90 adjusts the degree of opening of the fuel injection valve 32V to perform control so that the amount of fuel injected into the combustion chamber is reduced more than that before suppression of the output. For example, the control device 90 may close the fuel injection valve 32V to reduce the amount of injected fuel to zero. Processing of suppressing the output is not limited to that in the above-mentioned example. For example, the electronic throttle may be controlled so that the amount of air supplied to the combustion chamber is reduced more than that before suppression of the output. In a case where the travel motor is the electric motor, a power supply voltage to the electric motor may be limited. When the output of the travel motor 32 is suppressed, the speed is reduced as the off-road vehicle 20 can no longer maintain the speed.

In the next step S34, whether the ignition switch 108 has been turned off is determined. Step S34 corresponds to step S6 in FIG. 5. Processing returns to step S31 to repeat processing in and after step S31 when it is determined that the ignition switch 108 has not been turned off. The travel function limitation processing ends when it is determined that the ignition switch 108 has been turned off.

Figure 8:
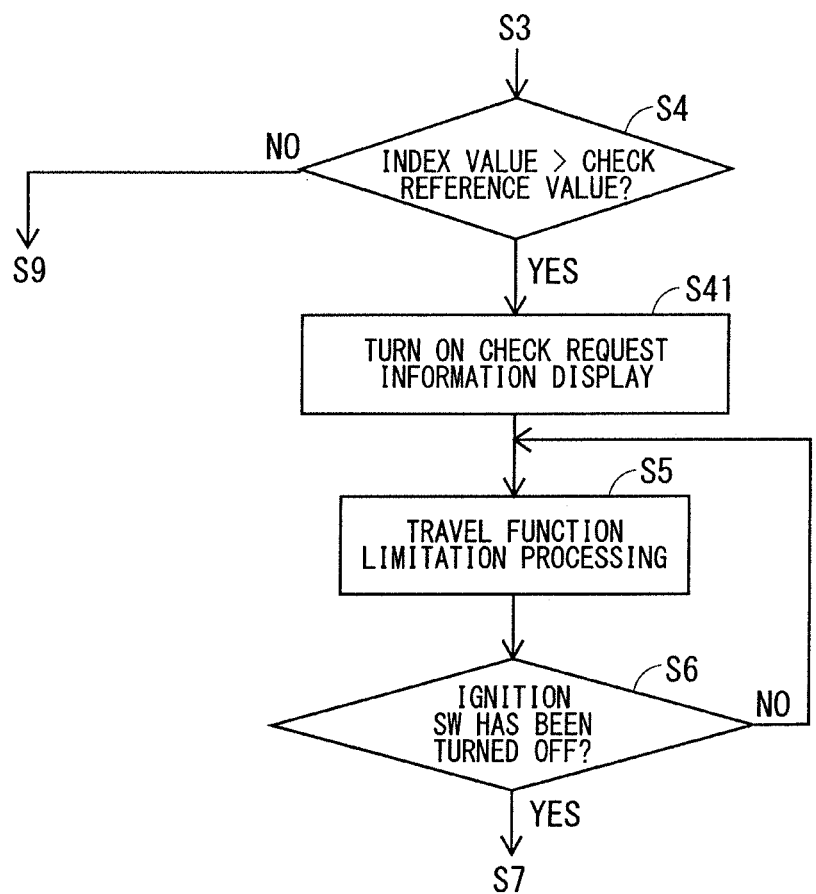
FIG. 8 is a flowchart showing an example of check request information display processing performed by the control device.

FIG. 8 is a flowchart showing an example of processing of providing notification of the above-mentioned belt check request condition when it is determined that the cumulative travel condition has become the belt check request condition. This processing is performed in parallel with or in quasi-parallel with processing shown in FIG. 7.

That is to say, when it is determined that the travel condition has become the check request condition in step S4, check request information display is turned on in step S41. For example, the control device 90 controls display of the display device 100 to display the warning information 106fa in the CVT check request display region 106f. The occupant can thus know that the occupant is requested to check whether the CVT belt 43 is required to be replaced by viewing the display device 100. Processing for display then ends.

The warning information 106fa is continued to be displayed until the ignition switch 108 or the power supply switch 96 is turned off.

The travel function limitation processing shown in step S5 and processing after the travel function limitation processing are then performed.

Processing of turning on the check request information display and the travel function limitation processing may simultaneously be performed.

The display device 100 displays various pieces of information for driving (e.g., the speed) in addition to the warning information 106fa. In the normal processing (see step S9) without performing the travel function limitation processing, the display device 100 displays the various pieces of information for driving (e.g., the speed) but does not display the warning information 106fa.

According to the off-road vehicle 20 having such a configuration, the travel function performed by the travel mechanism 30 is limited when it is determined that the travel condition has become the check request condition of the CVT belt 43. The occupant of the off-road vehicle 20 can thus effectively be prompted to check whether the CVT belt 43 is required to be replaced at a more suitable timing.

For example, in a case where a time to check whether the CVT belt 43 is required to be replaced is prompted only through display, travel performance itself does not change. The occupant can thus continue use similar to previous use, and thus an effect of calling attention to the check on whether the CVT belt 43 is required to be replaced can be small. According to the off-road vehicle 20 in the present embodiment, the travel function is limited, so that the occupant easily notices that the travel condition has become the check request condition for replacement of the CVT belt 43 due to limitation of the travel function during travel. Since the travel function is limited, the occupant is considered to use the off-road vehicle 20 by an operation method or with a sense different from that before limitation of the function. The occupant can thus effectively be prompted to check whether the CVT belt 43 is required to be replaced by limitation of the travel function.

The travel function is limited when the travel condition becomes the check request condition of the CVT belt 43. Even if the CVT belt 43 fails during limitation of the function, the off-road vehicle 20 is less likely to fail. For example, even if the CVT belt 43 is broken, and either the wheels 36F or the wheels 36R are locked, the off-road vehicle 20 is less likely to fail when the speed is limited to a low speed.

The cumulative travel index value 94b is determined as the cumulative travel condition, and the cumulative travel index value 94b is compared with the check reference value as a predetermined determination reference value. Whether the cumulative travel condition has become the belt check request condition is thus determined. Whether the cumulative travel condition has become the belt check request condition can thus be determined by a relatively simple method.

The travel distance or the travel time increases due to use of the off-road vehicle 20. The increase in travel distance or travel time has a correlation with frequency of use of the CVT belt 43. Whether the cumulative travel condition has become the belt check request condition is determined based on the travel distance or the travel time having the correlation with the frequency of use of the CVT belt, so that determination more accurately reflecting a usage condition of the CVT belt 43 can be made.

The cumulative travel index value 94b can be reset in response to the reset command when the CVT belt 43 is replaced. If the reset command is not input, unintended resetting of the cumulative travel index value 94b when the CVT belt 43 is not replaced can be suppressed. For example, unintended resetting of the cumulative travel index value 94b is effectively suppressed when the reset command can be input from the maintenance terminal 120 different from the off-road vehicle 20.

The travel function limitation processing includes processing of suppressing the output of the travel motor 32, so that the occupant is less likely to miss the predetermined belt check request condition due to suppression of the output of the travel motor 32. A load on the CVT belt 43 is also limited, so that the CVT belt 43 is less likely to fail.

The travel function limitation processing includes speed limitation processing, so that the speed of the off-road vehicle 20 is limited when the cumulative travel condition caused by the travel mechanism 30 has become the belt check request condition. The failure of the CVT belt 43 with the off-road vehicle 20 traveling at a speed exceeding a speed limit can thus be suppressed.

In the above-mentioned embodiment, the travel function limitation processing is performed either in the 2WD mode or in the 4WD mode. The speed is limited particularly in the 4WD mode, so that the load on the CVT belt 43 is suppressed to make the CVT belt 43 less likely to be broken. Breakage of the CVT belt 43 to lock all the front wheels 36F and the rear wheels 36R in the 4WD mode is thus suppressed.

The speed is limited at least in the 4WD mode, so that the occupant easily notices the check request condition of the CVT belt 43 at least in the 4WD mode.

The speed is limited in the 2WD mode and in the 4WD mode, so that the occupant easily notices the check request condition of the CVT belt 43.

When the cumulative travel condition has become the belt check request condition, not only the travel function is limited but also the display device 100 as the notification device is caused to provide notification of the belt check request condition. The occupant can thus recognize the belt check request condition due to notification provided by the display device 100 in addition to limitation of the travel function. The reason why the travel function is limited can be known through the display device 100.

When the notification device is the display device 100 that displays the travel information including the speed, the occupant can visually recognize the belt check request condition by viewing the display device 100 during driving.

Figure 9:
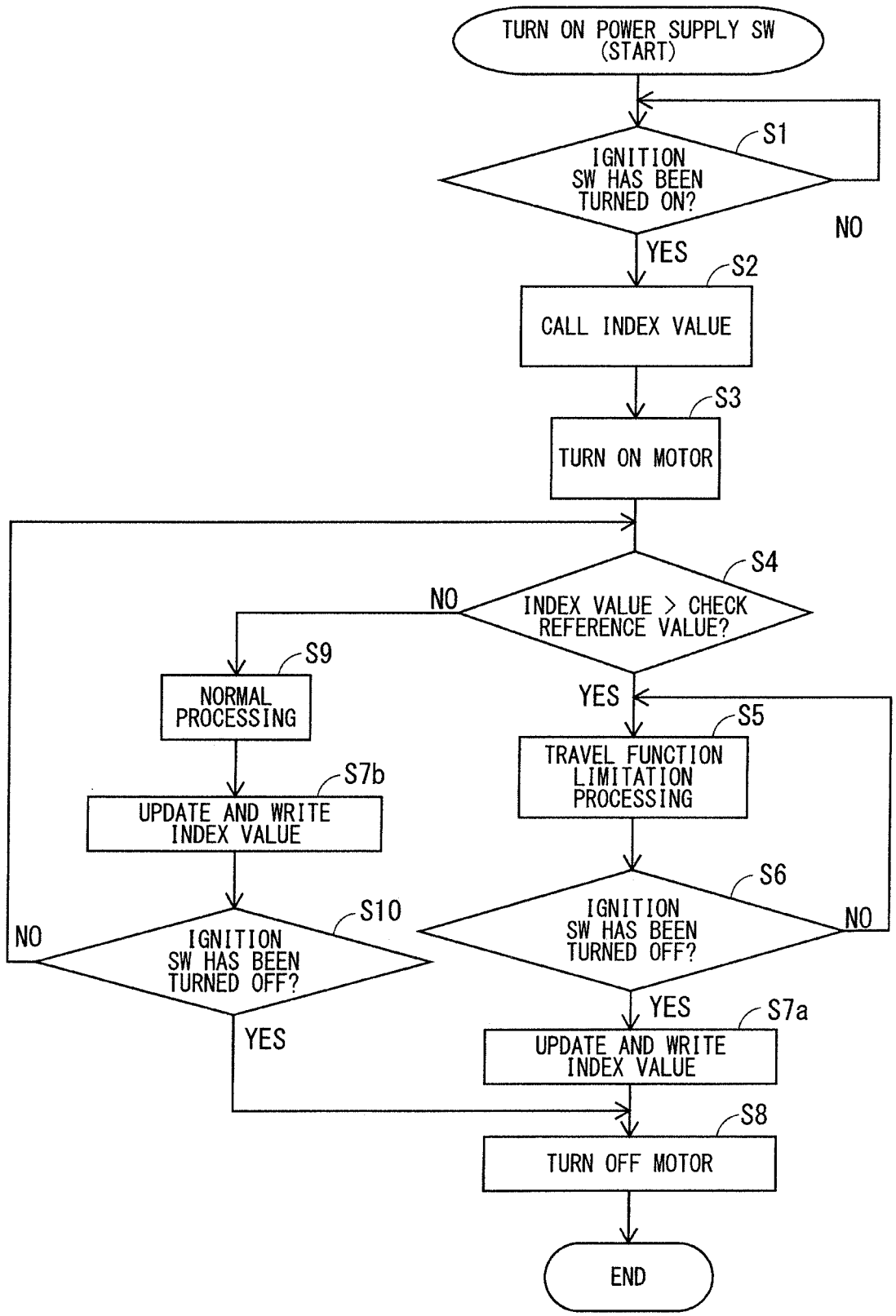
FIG. 9 is a flowchart showing a modification of FIG. 5.

FIG. 9 is a flowchart showing a modification of the flowchart shown in FIG. 5. FIG. 5 shows an example in which determination on the belt check request condition is made and, if necessary, the travel function limitation processing is performed at the start of travel, and a state of performing the travel function limitation processing based on a result of determination or a state of not performing the travel function limitation processing is continued during travel. Thus, when it is determined that the cumulative travel condition has not become the belt check request condition at the start of travel, the state of not performing the travel function limitation processing is continued during travel. As in the flowchart shown in FIG. 9, however, determination on the belt check request condition may be made during travel, and, when it is determined that the cumulative travel condition has become the belt check request condition, the travel function limitation processing may be started even during travel.

More specifically, step S7b of updating and writing the index value is performed between step S9 and step S10 in this flowchart. Furthermore, processing returns to step S4 when it is determined that the ignition switch 108 has not been turned off in step S10. Step S7b of updating and writing the index value and step S4 of determining whether the updated index value has exceeded the check reference value are thus repeated even during travel. Thus, processing proceeds to step S5 to perform the travel function limitation processing when the index value exceeds the check reference value during travel.

In the present embodiment, processing proceeds to step S7a of updating and writing the index value, and then proceeds to step S8 when it is determined that the ignition switch 108 has been turned off in step S6. Processing proceeds to step S8 when it is determined that the ignition switch 108 has been turned off in step S10. In contract, step S7a may be performed before step S6, and processing may return to step S4 when it is determined that the ignition switch 108 has not been turned off in step S6.

Modification 1

Figure 10:
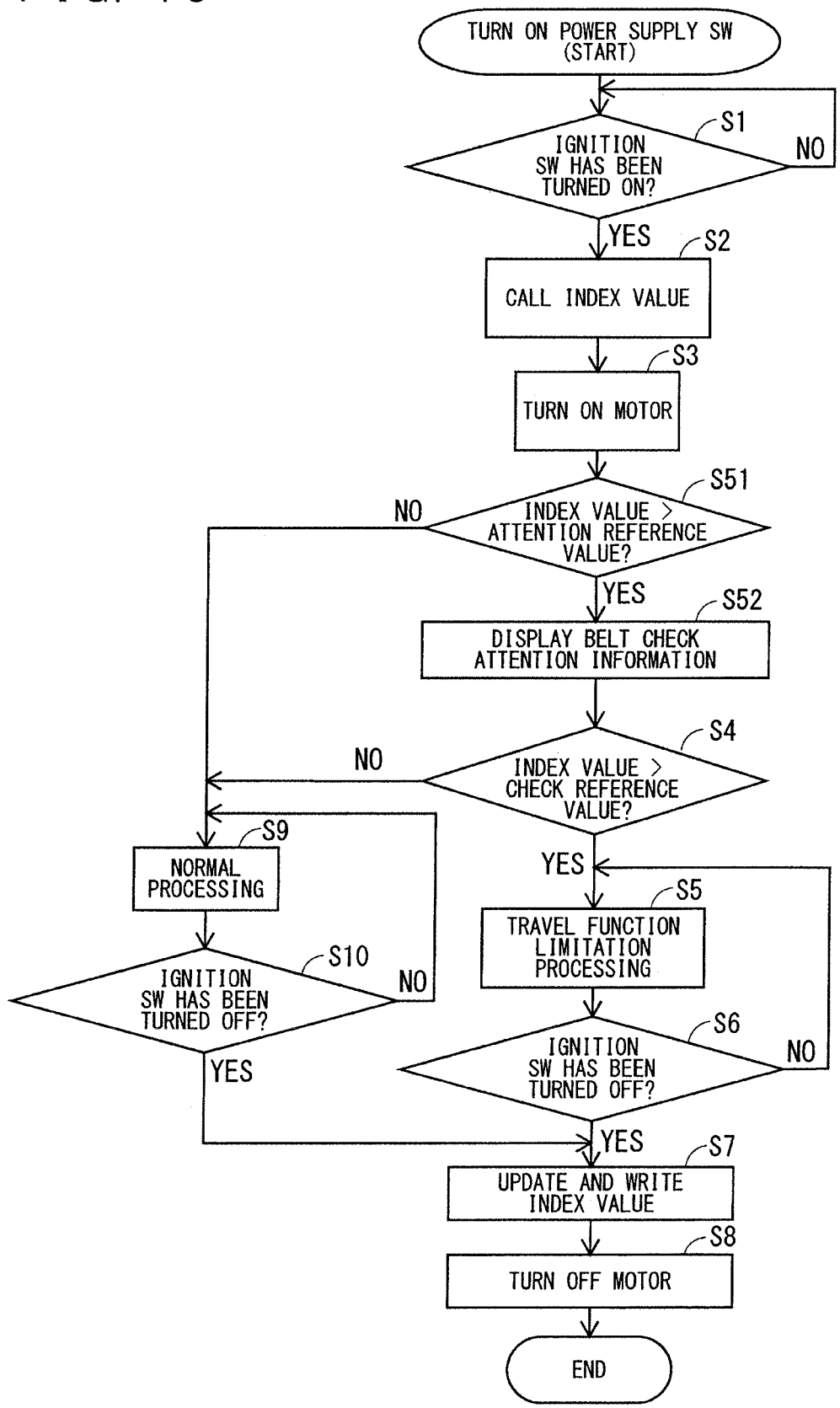
FIG. 10 is a flowchart showing an example of processing according to Modification 1.

FIG. 10 is a flowchart showing an example of processing according to Modification 1. In Modification 1, step S51 and step S52 are added between step S3 and step S4 in the above-mentioned embodiment. The other processing is the same as that described in the embodiment with reference to FIG. 5.

In step S51, the cumulative travel index value 94b is compared with an attention reference value. The attention reference value is set as a value to pay attention to replacement of the CVT belt 43 prior to the check reference value to check whether the CVT belt 43 is required to be replaced. The attention reference value is thus assumed to be smaller than the check reference value. For example, in a case where the cumulative travel index value 94b is the cumulative travel time, the attention reference value may be 100 hours, and the check reference value may be a value greater than 100 hours and equal to or smaller than 110 hours. For example, in a case where the cumulative travel index value 94b is the cumulative travel distance, the attention reference value may be 700 km, and the check reference value may be a value greater than 700 km and equal to or smaller than 800 km.

Processing proceeds to step S52 when it is determined that the cumulative travel index value 94b is greater than the attention reference value. Processing proceeds to step S9 to perform processing in and after step S9 when it is determined that the cumulative travel index value 94b is smaller than the attention reference value. Processing may proceed to either step S52 or step S9 when the cumulative travel index value 94b is the same as the attention reference value.

In step S52, belt check attention information display is turned on. For example, the control device 90 controls display of the display device 100 to cause the CVT warning light 102b to light up. The occupant can thus know that the occupant is requested to pay attention to a time to replace the CVT belt 43 by viewing the display device 100. The display device 100 displays various pieces of information for driving (e.g., the speed) in addition to the CVT warning light 102b. The display device 100 displays the various pieces of information for driving (e.g., the speed) without displaying the CVT warning light 102b when it is determined that the cumulative travel index value 94b is smaller than the attention reference value.

Processing then proceeds to step S4 to perform processing in and after step S4 as described above.

According to the present modification, when it is determined that the cumulative travel condition caused by the travel mechanism 30 has become a predetermined belt check attention condition as a stage prior to the belt check request condition based on the output of the rotation sensor 80, the display device 100 as the notification device is caused to provide notification of the belt check attention condition. The occupant can thus recognize the belt check attention condition before the travel function of the off-road vehicle 20 is limited. The occupant can thus be prompted to replace the CVT belt 43 early or to prepare for replacement of the CVT belt 43.

Furthermore, processing shown in FIG. 8 is performed when the travel function limitation processing (see FIG. 5) is performed, so that the warning information 106fa is displayed in the CVT check request display region 106f in addition to the CVT warning light 102b to display belt check attention information. The occupant can thus recognize the belt check request condition in addition to limitation of the travel function when the travel function is limited after the check attention information is displayed in advance.

Figure 11:
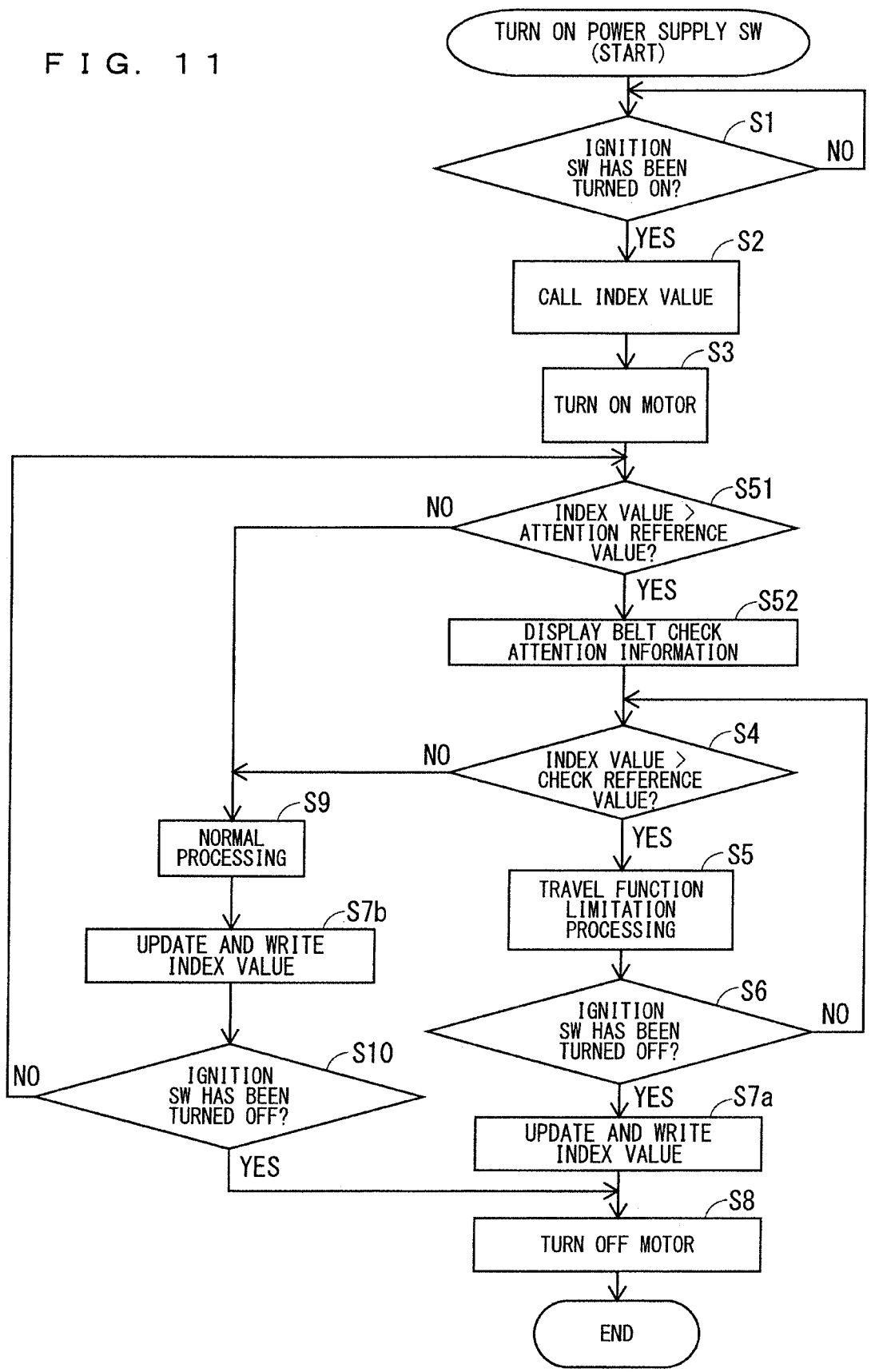
FIG. 11 is a flowchart showing an example of processing according to a modification of Modification 1.

FIG. 11 is a flowchart showing a modification of the flowchart shown in FIG. 10. As in an example shown in FIG. 11, whether the index value has exceeded the attention reference value may be determined during travel, and, when it is determined that the index value has exceeded the attention reference value, the belt check attention information may be displayed.

More specifically, step S7b of updating and writing the index value is performed between step S9 and step S10 in this flowchart as in the flowchart shown in FIG. 9. Furthermore, processing returns to step S51 before step S4 when it is determined that the ignition switch 108 has not been turned off in step S10. Step S7b of updating and writing the index value and step S51 of determining whether the index value has exceeded the attention reference value are thus repeated even during travel. Processing thus proceeds to step S52 to display the belt check attention information when it is determined that the index value has exceeded the attention reference value during travel. Processing in and after step S4 is then performed as described above. Processing proceeds to step S5 to perform the travel function limitation processing when the index value exceeds the check reference value during travel.

In the present embodiment, processing proceeds to step S7a of updating and writing the index value, and then proceeds to step S8 when it is determined that the ignition switch 108 has been turned off in step S6. Processing proceeds to step S8 when it is determined that the ignition switch 108 has been turned off in step S10. In contract, step S7a may be performed before step S6, and processing may return to step S51 when it is determined that the ignition switch 108 has not been turned off in step S6.

Processing to display the belt check attention information and the travel function limitation processing may be performed in the same processing flow or may be performed in different processing flows.

The attention reference value and the check reference value are different values when processing to display the belt check attention information and the travel function limitation processing are performed in the same processing flow or in different processing flows.

When processing to display the belt check attention information and the travel function limitation processing are performed in different processing flows, the function limitation processing is sometimes not performed even when the belt check attention information is displayed during travel. For example, as for processing to display the belt check attention information, determination processing based on the index value repeatedly updated and written during travel may repeatedly be performed, and, as for the travel function limitation processing, processing of determining whether the travel function is limited may be performed only at the start of travel.

Modification 2

Figure 12:
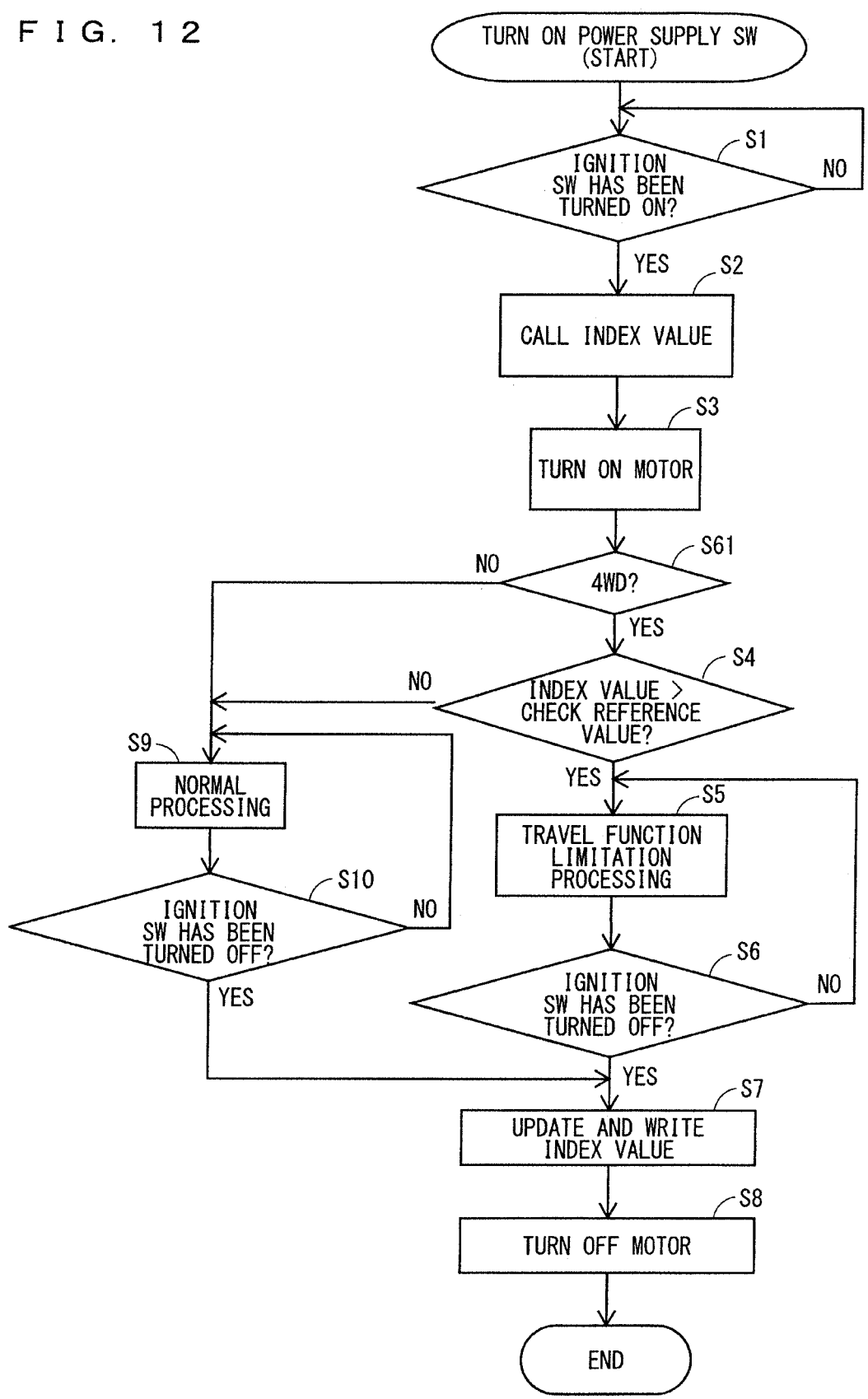
FIG. 12 is a flowchart showing an example of processing according to Modification 2.

FIG. 12 is a flowchart showing an example of processing according to Modification 2. In Modification 2, step S61 is performed between step S3 and step S4 in the above-mentioned embodiment. The other processing is the same as that described in the embodiment with reference to FIG. 5.

In step S61, whether the transfer box 70 is in the 4WD mode is determined. For example, whether the transfer box 70 is in the 2WD mode or in the 4WD mode is determined based on an output of the 4WD switch 26S. Processing proceeds to step S4 when it is determined that the transfer box 70 is in the 4WD mode, and proceeds to step S9 when it is determined that the transfer box 70 is not in the 4WD mode.

In a case where processing proceeds to step S4, the travel function limitation processing is performed when the cumulative travel index value 94b exceeds the check reference value as described in the embodiment. In a case where processing proceeds to step S9, processing for normal travel (see step S9) is performed without performing the travel function limitation processing regardless of whether the cumulative travel index value 94b exceeds the check reference value.

According to Modification 2, the speed limitation processing is performed in the 4WD mode as the front and rear wheel drive mode. In contrast, the speed limitation processing is not performed in the 2WD mode as the rear wheel drive mode.

The speed is thus limited in the 4WD mode in which both the front wheels 36F and the rear wheels 36R can be locked by failure of the CVT belt 43. In contrast, the vehicle 20 can travel without limitation of the speed due to the time to check whether the CVT belt 43 is required to be replaced in the 2WD mode in which either the wheels 36F or the wheels 36R are locked, and the other wheels can continue to rotate even if the CVT 42 is locked by failure of the CVT belt 43.

Since the 2WD mode is a mode in which the rear wheels 36R are driven, the front wheels 36F can continue to rotate even if the CVT belt 43 is broken with the speed not being limited in the rear wheel drive mode.

Figure 13:
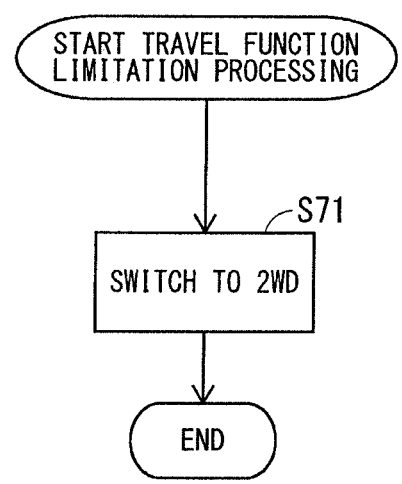
FIG. 13 is a flowchart showing an example of processing according to a modification of Modification 2.

FIG. 13 shows an example of processing that can be performed as the travel function limitation processing in step S5 in FIG. 12.

That is to say, the travel function limitation processing is started when the index value has exceeded the check reference value (see step S4). Assume herein that the transfer box 70 is in the front and rear wheel drive mode from step S61. The control device 90 thus switches the transfer box 70 to the 2WD mode as shown in step S71. For example, the control device 90 drives the actuator 74 of the transfer box 70 to cause the gears 71a to be spaced from each other to switch the transfer box 70 to the 2WD mode. The travel function limitation processing then ends.

Processing of switching to the rear wheel drive mode is thus performed when it is determined that the travel condition has become the belt check request condition with the transfer box 70 having been switched to the front and rear wheel drive mode. As described above, processing of switching to the rear wheel drive mode to limit the travel function may be performed in place of the speed limitation processing as the travel function limitation processing, or may be performed in parallel with the speed limitation processing.

It is assumed that the off-road vehicle 20 cannot be switched from the 2WD mode to the 4WD mode during travel.

Modification 3

Figure 14:
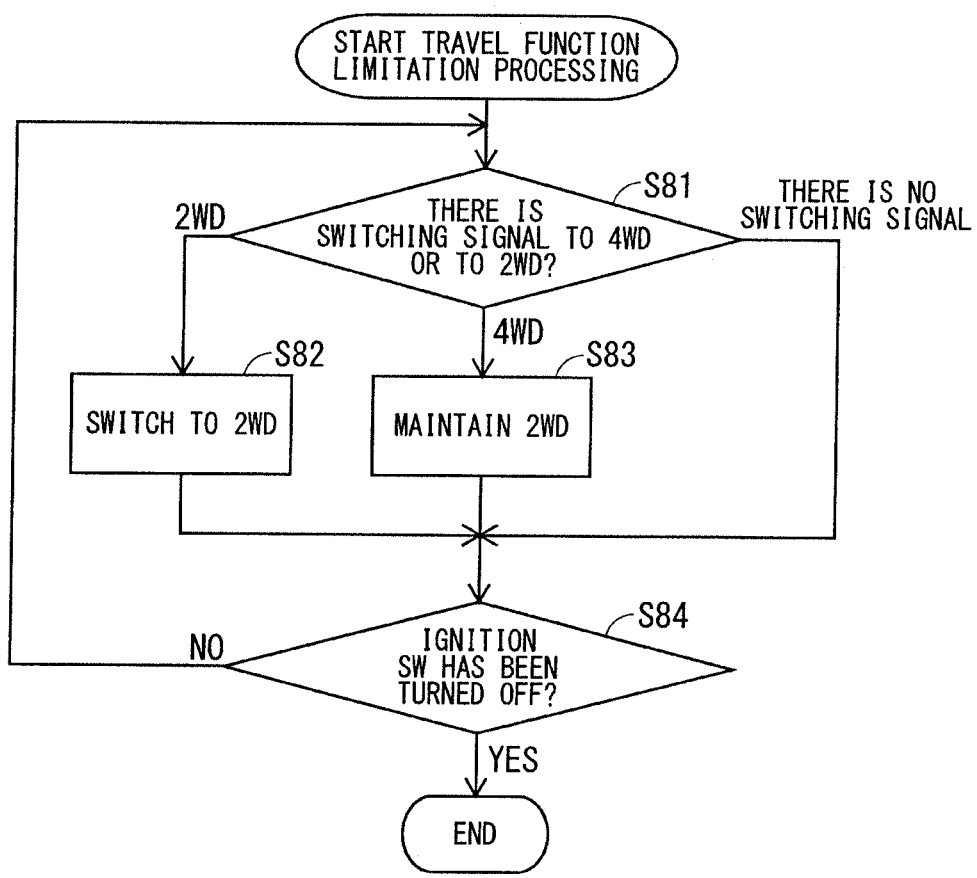
FIG. 14 is a flowchart showing an example of processing according to Modification 3.

FIG. 14 is a flowchart showing an example of processing according to Modification 3. An example of the travel function limitation processing performed in place of the travel function limitation processing shown in FIG. 7 will be described in Modification 3. This processing may be performed in parallel with the travel function limitation processing shown in FIG. 7.

First, whether switching to the front and rear wheel drive mode or to the rear wheel drive mode is performed is determined in step S81. Determination is made based on the output of the 2WD/4WD switch 26S, for example. Processing proceeds to step S82 when it is determined that switching to the rear wheel drive (2WD) mode is performed, proceeds to step S83 when it is determined that switching to the front and rear wheel drive (4WD) mode is performed, and proceeds to step S84 when it is determined that there is no switching signal.

In step S82, the control device 90 drives the actuator 74 of the transfer box 70 to cause the gears 71a to be spaced from each other to switch the transfer box 70 to the 2WD mode, for example. Switching to the 2WD mode can be performed even during the travel function limitation processing. Processing then proceeds to step S84.

In step S83, the control device 90 does not switch the mode of the transfer box 70, and thus maintains the 2WD mode. Switching to the 4WD mode cannot be performed during the travel function limitation processing. Processing then proceeds to step S84.

Whether the ignition switch 108 has been turned off is determined in step S84. Processing returns to step S81 to repeat processing in and after step S81 when it is determined that the ignition switch 108 has not been turned off. Processing ends when it is determined that the ignition switch 108 has been turned off. Due to this processing, the travel function limitation processing including processing of limiting switching from the rear wheel drive mode to the front and rear wheel drive mode is performed.

According to the present modification, switching to the 4WD mode is not performed when the travel condition becomes the check request condition of the CVT belt 43. Breakage of the CVT belt 43 in the 4WD mode is thus suppressed. Locking of the front wheels 36F and the rear wheels 36R is thus suppressed.

When the travel condition becomes the check request condition of the CVT belt 43, switching from 4WD mode to the 2WD mode is performed. Breakage of the CVT belt 43 in the 4WD mode is thus more surely suppressed.

Other Modifications

In the above-mentioned embodiment, transmission gears may be interposed in the middle of the propeller shaft 60 and between the propeller shaft 60 and the wheel drive shafts 64F and 64R.

In the above-mentioned embodiment, the off-road vehicle 20 may not necessarily be a vehicle switchable between a four-wheel drive mode and a two-wheel drive mode. The off-road vehicle 20 may be a vehicle that is always in the four-wheel drive mode. The off-road vehicle 20 may not necessarily be a vehicle that can travel in the four-wheel drive mode. For example, the transfer box 70 may be omitted from the off-road vehicle 20. In this case, the off-road vehicle 20 is a rear wheel drive vehicle. The off-road vehicle 20 may be a front wheel drive vehicle.

An example in which the sensor 80 that detects the travel condition caused by the travel mechanism 30 is the rotation sensor that detects the number of rotations of either the wheels 36F or the wheels 36R has been described in the present embodiment. When the travel mechanism 30 causes the off-road vehicle 20 to travel, the wheels 36F and the wheels 36R rotate. Whether the travel mechanism 30 actually causes the off-road vehicle 20 to travel can be detected by the rotation sensor for the wheels 36F and the wheels 36R.

The sensor 80 is not required to detect actual travel, and may be a sensor that detects a condition in which the travel mechanism 30 is likely to cause the off-road vehicle 20 to travel.

For example, the travel motor 32 is rotationally driven when the off-road vehicle 20 travels. In a case where the travel motor 32 is the internal combustion engine, the travel motor 32 can rotate even during stopping. The travel motor 32, however, is considered to rotate for travel most of the time. A rotation sensor that detects the number of rotations of the travel motor 32 is applicable to the sensor 80. In a case where the travel motor 32 is the internal combustion engine, the sensor 80 may be a rotation sensor that detects rotation of a crankshaft.

When the off-road vehicle 20 travels, for example, a power supply of the off-road vehicle 20 is turned on to supply power to each component including the control device 90.

The power supply of the off-road vehicle 20 can be turned on even during stopping. The power supply of the off-road vehicle 20, however, is considered to be turned on for travel most of the time. A switch to turn on and off the power supply of the off-road vehicle 20 can thus be used as the sensor 80.

That is to say, various sensors that each help to detect a value that increases or decreases with increasing travel time or travel distance caused by the travel mechanism 30 are applicable to the sensor 80.

The notification device may not necessarily be the display device 100. The notification device may be a device that provides notification using a voice or a buzzing sound.

The travel function limitation processing is not limited to that described in the above-mentioned embodiment or modifications. For example, the travel motor 32 may include a sensor that detects the number of rotations, and the number of rotations of the travel motor 32 may be limited based on an output of the rotation sensor. The travel motor 32 may include a torque sensor, and torque of the travel motor 32 may be limited based on an output of the torque sensor. The number of rotations or the torque of the travel motor 32 is limited by controlling the amount of input air or the amount of injected fuel, for example.

The off-road vehicle 20 may include an acceleration sensor that detects acceleration during travel, and the travel motor 32 may be controlled based on an output of the acceleration sensor so that acceleration falls within a predetermined acceleration range.

The travel function is not required to be limited through control of the travel motor 32. The speed of the off-road vehicle 20 may be limited by controlling the transmission gear ratio of the CVT 42 or by maintaining the transmission gear ratio of the gear type transmission 50 to low.

In addition, in a case where the handle 26 is a power steering system, an auxiliary function of the handle 26 may be controlled to perform control such as a change of steering feel.

An example of processing of comparing the cumulative travel index value 94b with a single check reference value to limit the travel function on a single level has been described in the above-mentioned embodiment. The travel function, however, may be limited on levels. For example, a first check reference value and a second check reference value greater than the first check reference value are set. Limitation processing on a first level may be performed when the cumulative travel index value 94b exceeds the first check reference value, and limitation processing on a second level in which the travel function is limited more than that in limitation processing on the first level may be performed when the cumulative travel index value 94b exceeds the second check reference value. For example, limitation processing on the first level may be processing of limiting the speed to a first speed (e.g., 30 km/h), and limitation processing on the second level may be processing of limiting the speed to a second speed (e.g., 15 km/h) lower than the first speed.

Switching to the 4WD mode may be limited as limitation of the function on the first level, and the speed may be limited as limitation of the function on the second level.

Configurations described in the above-mentioned embodiment and modifications can be combined with each other as appropriate unless any contradiction occurs.

<Additional Remark>

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present application discloses the following aspects.

A first aspect is an off-road vehicle including: a travel mechanism that includes a travel motor, wheels including a front wheel and a rear wheel, and a power transmission mechanism transmitting rotation from the travel motor to the wheels, the power transmission mechanism including a CVT belt and a transfer box switchable between a front and rear wheel drive mode in which rotation of the travel motor is transmitted to both the front wheel and the rear wheel and a rear wheel drive mode in which rotation of the travel motor is transmitted to the rear wheel; a sensor that detects a travel condition caused by the travel mechanism; and processing circuitry that determines whether the travel condition caused by the travel mechanism has become a predetermined belt check request condition based on an output of the sensor, and performs, when determining that the travel condition has become the belt check request condition, travel function limitation processing of limiting a travel function performed by the travel mechanism more than that before determination.

According to the off-road vehicle, a check on whether the CVT belt is required to be replaced at a more suitable timing can effectively be prompted by limitation of the travel function performed by the travel mechanism.

A second aspect is the off-road vehicle according to the first aspect, wherein the processing circuitry determines a cumulative travel index value as the travel condition based on the output of the sensor, and compares the cumulative travel index value with a predetermined determination reference value to determine whether the travel condition has become the predetermined belt check request condition.

Whether the travel condition has become the predetermined belt check request condition can thus be determined by a relatively simple determination method.

A third aspect is the off-road vehicle according to the first aspect, wherein the travel condition includes a cumulative travel distance or a cumulative travel time.

In this case, whether the travel condition has become the belt check request condition is determined based on a value having a correlation with frequency of use of the CVT belt, so that determination more accurately reflecting a usage condition can be made.

A fourth aspect is the off-road vehicle according to the second aspect, wherein the processing circuitry resets the cumulative travel index value in response to a reset command.

In this case, undesired limitation of the travel function can be prevented by resetting the cumulative value when the CVT belt is changed.

A fifth aspect is the off-road vehicle according to the first aspect, wherein the travel function limitation processing includes processing of suppressing an output of the travel motor.

Missing of the occupant of the predetermined belt check request condition can thus be suppressed due to suppression of the output of the travel motor.

A sixth aspect is the off-road vehicle according to the first aspect, wherein the travel function limitation processing includes speed limitation processing.

The speed of the off-road vehicle is thus limited when the cumulative travel condition caused by the travel mechanism has become the belt check request condition.

A seventh aspect is the off-road vehicle according to the sixth aspect, wherein the speed limitation processing is performed at least in the front and rear wheel drive mode.

In this case, the speed is limited in the front and rear wheel drive mode, so that the CVT belt is less likely to be broken. Breakage of the CVT belt to lock the front and rear wheels is suppressed.

An eighth aspect is the off-road vehicle according to the seventh aspect, wherein the speed limitation processing is performed both in the front and rear wheel drive mode and in the rear wheel drive mode.

In this case, the speed is limited in the front and rear wheel drive mode and in the rear wheel drive mode, so that the occupant easily notices limitation of the speed.

A ninth aspect is the off-road vehicle according to the seventh aspect, wherein the speed limitation processing is performed in the front and rear wheel drive mode except in the rear wheel drive mode.

The vehicle can thus travel without limitation of the speed in the rear wheel drive mode. The front wheels can continue to rotate even if the CVT belt is broken with the speed not being limited in the rear wheel drive mode.

A tenth aspect is the off-road vehicle according to the first aspect, wherein the travel function limitation processing includes processing of limiting switching from the rear wheel drive mode to the front and rear wheel drive mode.

Breakage of the CVT belt in the front and rear wheel drive mode is thus suppressed. Locking of both the front wheels and the rear wheels is thus suppressed.

An eleventh aspect is the off-road vehicle according to the tenth aspect, wherein the travel function limitation processing includes processing of switching, when it is determined that the travel condition has become the belt check request condition with the transfer box having been switched to the front and rear wheel drive mode, the front and rear wheel drive mode to the rear wheel drive mode.

According to this aspect, the front and rear wheel drive mode is switched to the rear wheel drive mode when the travel condition has become the belt check request condition. Breakage of the CVT belt and locking of both the front wheels and the rear wheels are thus suppressed in the front and rear wheel drive mode.

A twelfth aspect is the off-road vehicle according to the first aspect, further including a notification device that provides information to an occupant of the off-road vehicle so that the information is recognizable by the occupant, wherein the processing circuitry causes, when it is determined that a cumulative travel condition caused by the travel mechanism has become a predetermined belt check attention condition as a stage prior to the belt check request condition based on the output of the sensor, the notification device to provide notification of the belt check attention condition.

According to this aspect, the occupant can recognize the belt check attention condition before the function is limited.

A thirteenth aspect is the off-road vehicle according to the first aspect, further including a notification device that provides information to an occupant of the off-road vehicle so that the information is recognizable by the occupant, wherein the processing circuitry causes, when it is determined that a cumulative travel condition caused by the travel mechanism has become the belt check request condition based on the output of the sensor, the notification device to provide notification of the belt check request condition.

The occupant can thus recognize the belt check request condition in addition to limitation of the function due to notification operation performed by the notification device when the function is limited.

A fourteenth aspect is the off-road vehicle according to the thirteenth aspect, wherein the notification device is a display device that displays travel information including a speed.

In this case, the occupant can visually recognize the belt check request condition by viewing the display device during driving.

A fifteenth aspect is the off-road vehicle according to the first aspect, further including a notification device that provides information to an occupant of the off-road vehicle so that the information is recognizable by the occupant, wherein the processing circuitry causes, when it is determined that a cumulative travel condition caused by the travel mechanism has become a predetermined belt check attention condition as a stage prior to the belt check request condition based on the output of the sensor, the notification device to provide notification of the belt check attention condition, and causes, when it is determined that the cumulative travel condition caused by the travel mechanism has become the belt check request condition based on the output of the sensor, the notification device to provide notification of the belt check request condition.

According to this aspect, the occupant can recognize the belt check attention condition before the function is limited. Furthermore, the occupant can recognize the belt check request condition in addition to limitation of the function due to the notification operation performed by the notification device when the function is limited.

A sixteenth aspect is a vehicle control method including: detecting a travel condition; determining, based on the detected travel condition, whether a cumulative travel condition in terms of a time or a distance has become a predetermined maintenance condition; and limiting a travel function more than that before determination when it is determined that the cumulative travel condition has become the predetermined maintenance condition.

According to the vehicle control method, maintenance at a more suitable timing can effectively be prompted by limitation of the travel function.

The foregoing description is in all aspects illustrative and not restrictive. It is therefore understood that numerous unillustrated modifications can be devised without departing from the scope of the invention.

What is claimed is:

1. An off-road vehicle comprising:
a travel mechanism that includes a travel motor, wheels including a front wheel and a rear wheel, and a power transmission mechanism transmitting rotation from the travel motor to the wheels, the power transmission mechanism including a continuously variable transmission (CVT) belt and a transfer box switchable between a front and rear wheel drive mode in which rotation of the travel motor is transmitted to both the front wheel and the rear wheel and a rear wheel drive mode in which rotation of the travel motor is transmitted to the rear wheel and is not transmitted to the front wheel;
a sensor that detects a travel condition caused by the travel mechanism; and
processing circuitry that
determines whether the travel condition caused by the travel mechanism has become a predetermined belt check request condition based on an output of the sensor, and
performs, when determining that the travel condition has become the belt check request condition, travel function limitation processing of limiting a travel function performed by the travel mechanism more than that before determination,
wherein the processing circuitry determines a cumulative travel index value as a travel condition based on an output of the sensor, the cumulative travel index value being either one of travel distance, travel time, or an index value that increases or decreases with travel distance or travel time; and
wherein the travel function limitation processing comprises processing of suppressing an output of the travel motor or limiting speed; and
wherein the speed limitation processing is configured such that limiting speed is only performed in the front and rear wheel drive mode, and is not performed in the rear wheel drive mode.

2. The off-road vehicle according to claim 1, wherein the processing circuitry compares the cumulative travel index value with a predetermined determination reference value to determine whether the travel condition has become the predetermined belt check request condition.

3. The off-road vehicle according to claim 1, wherein the travel condition comprises a cumulative travel distance or a cumulative travel time.

4. The off-road vehicle according to claim 1, wherein the speed limitation processing is performed both in the front and rear wheel drive mode and in the rear wheel drive mode.

5. The off-road vehicle according to claim 1, wherein the travel function limitation processing comprises processing of limiting switching from the rear wheel drive mode to the front and rear wheel drive mode.

6. An off-road vehicle comprising:
a travel mechanism that includes a travel motor, wheels including a front wheel and a rear wheel, and a power transmission mechanism transmitting rotation from the travel motor to the wheels, the power transmission mechanism including a continuously variable transmission (CVT) belt and a transfer box switchable between a front and rear wheel drive mode in which rotation of the travel motor is transmitted to both the front wheel and the rear wheel and a rear wheel drive mode in which rotation of the travel motor is transmitted to the rear wheel;
a sensor that detects a travel condition caused by the travel mechanism; and
processing circuitry that
determines whether the travel condition caused by the travel mechanism has become a predetermined belt check request condition based on an output of the sensor, and
performs, when determining that the travel condition has become the belt check request condition, travel function limitation processing of limiting a travel function performed by the travel mechanism more than that before determination,
wherein the processing circuitry determines a cumulative travel index value as a travel condition based on an output of the sensor, the cumulative travel index value being either one of travel distance, travel time, or an index value that increases or decreases with travel distance or travel time,
wherein the travel function limitation processing comprises processing of limiting switching from the rear wheel drive mode to the front and rear wheel drive mode, and
wherein the travel function limitation processing comprises processing of switching, when it is determined that the travel condition has become the belt check request condition with the transfer box having been switched to the front and rear wheel drive mode, the front and rear wheel drive mode to the rear wheel drive mode.

7. The off-road vehicle according to claim 1, further comprising
a notification device that provides information to an occupant of the off-road vehicle so that the information is recognizable by the occupant, wherein
the processing circuitry causes, when it is determined that a cumulative travel condition caused by the travel mechanism has become a predetermined belt check attention condition as a stage prior to the belt check request condition based on the output of the sensor, the notification device to provide notification of the belt check attention condition.

8. The off-road vehicle according to claim 1, further comprising
a notification device that provides information to an occupant of the off-road vehicle so that the information is recognizable by the occupant, wherein
the processing circuitry causes, when it is determined that a cumulative travel condition caused by the travel mechanism has become the belt check request condition based on the output of the sensor, the notification device to provide notification of the belt check request condition.

9. The off-road vehicle according to claim 8, wherein the notification device is a display device that displays travel information including a speed.

10. The off-road vehicle according to claim 1, further comprising
a notification device that provides information to an occupant of the off-road vehicle so that the information is recognizable by the occupant, wherein
the processing circuitry
causes, when it is determined that a cumulative travel condition caused by the travel mechanism has become a predetermined belt check attention condition as a stage prior to the belt check request condition based on the output of the sensor, the notification device to provide notification of the belt check attention condition, and
causes, when it is determined that the cumulative travel condition caused by the travel mechanism has become the belt check request condition based on the output of the sensor, the notification device to provide notification of the belt check request condition.

11. A vehicle control method comprising:
detecting a travel condition based on a sensor;
processing circuitry determining, based on the detected travel condition, whether a cumulative travel condition in terms of a time or a distance has become a predetermined maintenance condition; and
the processing circuitry limiting a travel function by a travel mechanism that includes a travel motor, wheels including a front wheel and a rear wheel, and a power transmission mechanism transmitting rotation from the travel motor to wheels of the vehicle, more than that before determination, or providing notification of warning maintenance, when it is determined that the cumulative travel condition has become the predetermined maintenance condition,
the travel function limiting processing circuitry suppresses an output of the travel motor or limits speed; and
the cumulative travel condition being a travel distance, a travel time, or a condition changing according to a travel distance or a travel time;
wherein the power transmission mechanism includes a continuously variable transmission (CVT) belt and a transfer box switchable between a front and rear wheel drive mode in which rotation of the travel motor is transmitted to both the front wheel and the rear wheel and a rear wheel drive mode in which rotation of the travel motor is transmitted to the rear wheel and is not transmitted to the front wheel; and
wherein the speed limitation processing is configured such that limiting speed is only performed in the front and rear wheel drive mode, and is not performed in the rear wheel drive mode.

12. The vehicle control method according to claim 11, wherein the predetermined maintenance condition is a condition of requesting check of the continuously variable transmission (CVT) belt of the vehicle.

13. The vehicle control method according to claim 11, wherein
the predetermined maintenance condition is a condition of limiting function for maintenance.

14. A vehicle comprising:
a travel mechanism that includes a travel motor, wheels including a front wheel and a rear wheel, a power transmission mechanism transmitting rotation from the travel motor to the wheels, the power transmission mechanism including a continuously variable transmission (CVT) belt, and a transfer box switchable between a front and rear wheel drive mode in which rotation of the travel motor is transmitted to both the front wheel and the rear wheel and a rear wheel drive mode in which rotation of the travel motor is transmitted to the rear wheel and is not transmitted to the front wheel;
a sensor that detects a travel condition caused by the travel mechanism; and
processing circuitry that
determines whether the travel condition caused by the travel mechanism has become a predetermined maintenance condition based on an output of the sensor, and
performs travel function limitation processing of limiting a travel function performed by the travel mechanism more than that before determination or performs notification processing of prompting maintenance, when determining that the travel condition has become the predetermined maintenance condition,
wherein the processing circuitry determines a cumulative travel index value as a travel condition based on an output of the sensor, the cumulative travel index value being either one of travel distance, travel time, or an index value that increases or decreases with travel distance or travel time;
wherein the travel function limitation processing comprises processing of suppressing an output of the travel motor or limiting speed; and
wherein the speed limitation processing is configured such that limiting speed is only performed in the front and rear wheel drive mode, and is not performed in the rear wheel drive mode.

15. The off-road vehicle according to claim 1, further comprising:
a storage device that stores the cumulative travel index value,
wherein the processing circuitry adds travel time or distance during current travel to the cumulative travel index value stored in the storage device and writes a value after addition in the storage device as the cumulative travel index value.

16. The off-road vehicle according to claim 1, wherein the cumulative travel index value is an index value relative to a value when the off-road vehicle is new or at resetting.

* * * * *